United States Patent
Karov et al.

(10) Patent No.: US 10,346,540 B2
(45) Date of Patent: Jul. 9, 2019

(54) SELF-LEARNING STATISTICAL NATURAL LANGUAGE PROCESSING FOR AUTOMATIC PRODUCTION OF VIRTUAL PERSONAL ASSISTANTS

(71) Applicant: Intel Corporation, Santa Clara, CA (US)

(72) Inventors: Yael Karov, Tel Aviv (IL); Micha Breakstone, R'anana (IL); Reshef Shilon, Palo Alto, CA (US); Orgad Keller, Tel Aviv (IL); Eric Shellef, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/695,502

(22) Filed: Sep. 5, 2017

(65) Prior Publication Data

US 2018/0107652 A1    Apr. 19, 2018

Related U.S. Application Data

(63) Continuation of application No. 15/332,084, filed on Oct. 24, 2016, now Pat. No. 9,798,719, which is a
(Continued)

(51) Int. Cl.
*G06F 17/27* (2006.01)
*G06F 16/36* (2019.01)
*G06F 16/9032* (2019.01)

(52) U.S. Cl.
CPC .......... *G06F 17/2785* (2013.01); *G06F 16/36* (2019.01); *G06F 16/90332* (2019.01);
(Continued)

(58) Field of Classification Search
None
See application file for complete search history.

(56) References Cited

U.S. PATENT DOCUMENTS 6,567,778 B1 * 5/2003 Chao Chang ......... G06F 17/271
704/257
8,346,563 B1 * 1/2013 Hjelm ................. G10L 15/1822
379/88.01
(Continued)

*Primary Examiner* — Marcus T Riley
(74) *Attorney, Agent, or Firm* — Barnes & Thornburg LLP

(57) ABSTRACT

Technologies for natural language request processing include a computing device having a semantic compiler to generate a semantic model based on a corpus of sample requests. The semantic compiler may generate the semantic model by extracting contextual semantic features or processing ontologies. The computing device generates a semantic representation of a natural language request by generating a lattice of candidate alternative representations, assigning a composite weight to each candidate, and finding the best route through the lattice. The composite weight may include semantic weights, phonetic weights, and/or linguistic weights. The semantic representation identifies a user intent and slots associated with the natural language request. The computing device may perform one or more dialog interactions based on the semantic request, including generating a request for additional information or suggesting additional user intents. The computing device may support automated analysis and tuning to improve request processing. Other embodiments are described and claimed.

20 Claims, 9 Drawing Sheets

Related U.S. Application Data continuation of application No. 14/341,013, filed on Jul. 25, 2014, now Pat. No. 9,772,994.

(60) Provisional application No. 61/858,151, filed on Jul. 25, 2013.

(52) U.S. Cl.
CPC .......... *G06F 17/271* (2013.01); *G06F 17/277* (2013.01); *G06F 17/279* (2013.01)

(56) References Cited

U.S. PATENT DOCUMENTS

| | | | |
|---|---|---|---|
| 8,983,995 B2 * | 3/2015 | Hsu | G06F 16/3322 707/767 |
| 9,318,108 B2 * | 4/2016 | Gruber | G10L 15/22 |
| 9,772,994 B2 * | 9/2017 | Karov | G06F 17/2785 |
| 9,798,719 B2 * | 10/2017 | Karov | G06F 17/2785 |
| 9,916,538 B2 * | 3/2018 | Zadeh | G06N 7/005 |
| 2009/0326947 A1 * | 12/2009 | Arnold | G06Q 30/02 704/257 |
| 2013/0124523 A1 * | 5/2013 | Rogers | G06F 19/32 707/737 |
| 2013/0291019 A1 * | 10/2013 | Burkitt | H04N 21/4828 725/53 |
| 2015/0032443 A1 * | 1/2015 | Karov | G06F 17/2785 704/9 |
| 2016/0171979 A1 * | 6/2016 | Breazeal | B25J 9/0003 704/9 |
| 2017/0039181 A1 * | 2/2017 | Karov | G06F 17/2785 |
| 2018/0107652 A1 * | 4/2018 | Karov | G06F 17/2785 |

\* cited by examiner

SELF-LEARNING STATISTICAL NATURAL LANGUAGE PROCESSING FOR AUTOMATIC PRODUCTION OF VIRTUAL PERSONAL ASSISTANTS

CROSS-REFERENCE TO RELATED U.S. PATENT APPLICATION

This application is a continuation application of U.S. application Ser. No. 15/332,084, entitled "SELF-LEARNING STATISTICAL NATURAL LANGUAGE PROCESSING FOR AUTOMATIC PRODUCTION OF VIRTUAL PERSONAL ASSISTANTS," which was filed on Oct. 24, 2016, and which is a continuation application of U.S. application Ser. No. 14/341,013, entitled "SELF-LEARNING STATISTICAL NATURAL LANGUAGE PROCESSING FOR AUTOMATIC PRODUCTION OF VIRTUAL PERSONAL ASSISTANTS," which was filed on Jul. 25, 2014, and which claims priority under 35 U.S.C. § 119(e) to U.S. Provisional Patent Application Ser. No. 61/858,151, entitled "SYSTEM AND METHODS FOR SELF-LEARNING STATISTICAL NATURAL LANGUAGE QUERY UNDERSTANDING, GENERATION AND ENHANCEMENT FOR AUTOMATIC PRODUCTION OF VIRTUAL PERSONAL ASSISTANTS," which was filed on Jul. 25, 2013.

BACKGROUND

As smart mobile devices become widespread and ubiquitous, natural language interactions are becoming popular for daily functionalities such as information retrieval, shopping assistance, reservations, ticketing, social-media postings, correspondence, note-taking and time-management. Some devices may include a virtual personal assistant (VPA) to provide a natural language interface to those functionalities. Typically, VPAs require manual tuning and/or configuration to understand additional natural language queries and/or provide additional functionality.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
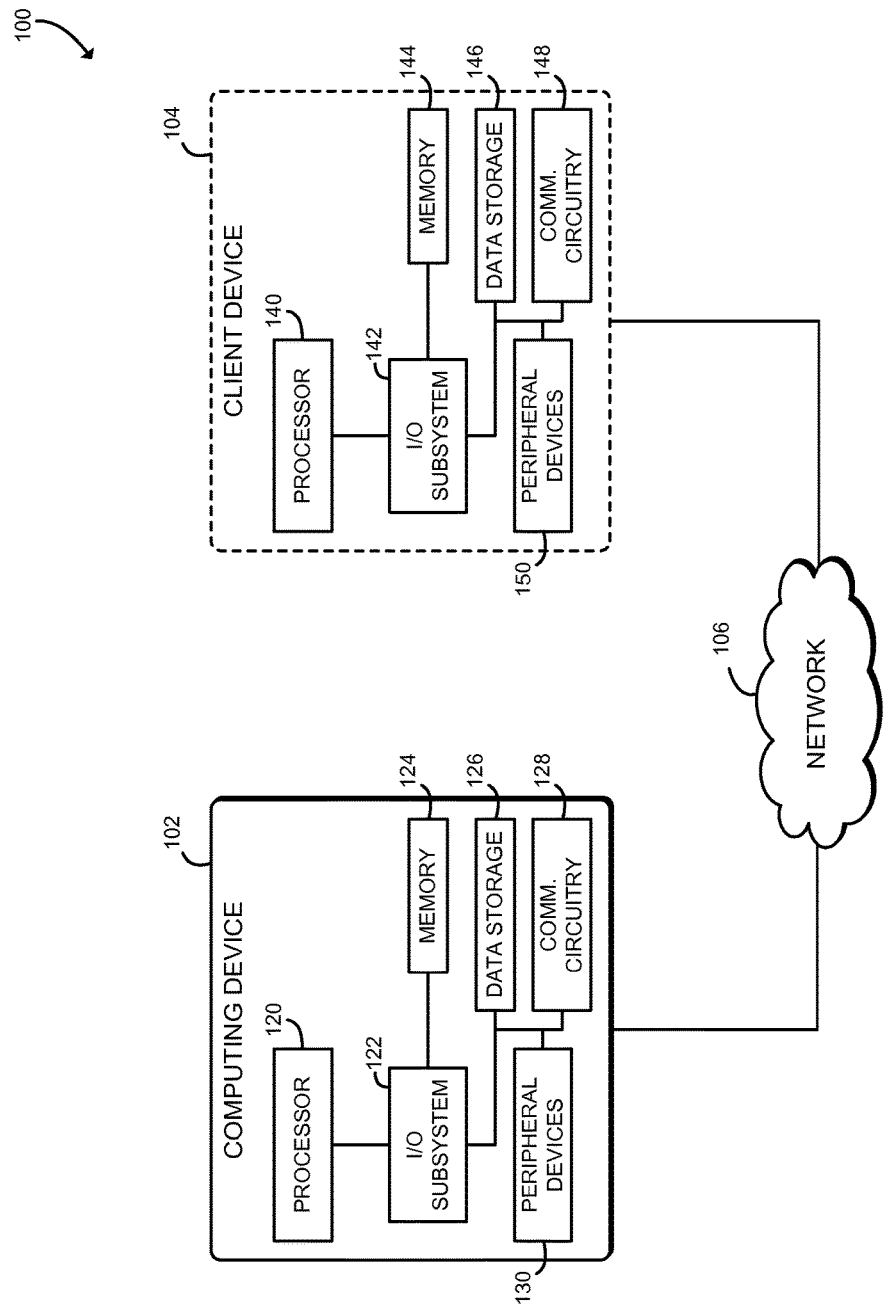
FIG. 1 is a simplified block diagram of at least one embodiment of a system for self-learning natural language processing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for self-learning natural language processing includes a computing device 102 and, in some embodiments, a client device 104, which may be in communication with each other over a network 106. In use, a user may input a natural language request to the computing device 102. The user may input the request directly to the computing device 102, for example using a text or a speech input device, or may input the request via a remote client device 104, for example a smartphone. The computing device 102 generates a lattice of potential interpretations of the request using a linguistic/phonetic speech model as well as a semantic model. The computing device 102 may generate the semantic model offline, prior to receiving the natural language request, based on a corpus of sample requests. The computing device 102 weighs each candidate of the lattice using a composite weight based on both the linguistic/phonetic model and the semantic model. The computing device 102 generates the semantic representation of the request by finding the optimal route through the lattice, based on the composite weighting of each alternative. The semantic representation may be provided to a dialog manager that records, predicts, and generates dialog interactions such as responses, additional requests, and may perform requested user interactions. The computing device 102 may automatically tune parameters of the semantic model, the lattice generation, and/or other operations of the computing device 102, based on the results of the natural language request decoding. Thus, the system 100 facilitates producing and/or tuning VPAs automatically. The system 100 may facilitate the understanding, generation, and enhancement of natural language requests, using self-learning statistical methods and machine learning algorithms. The resulting VPAs may be highly robust to noisy input, which may result from foreign accents or acoustically noisy environments in spoken input, malformed textual input, or highly-specified or esoteric domains of knowledge.

The computing device 102 may be embodied as any type of device capable of performing the functions described herein. For example, the computing device 102 may be embodied as, without limitation, a smartphone, a cellular phone, a tablet computer, a notebook computer, a laptop computer, a desktop computer, a workstation, a server computing device, a distributed computing system, a multiprocessor system, a consumer electronic device, a smart appliance, and/or any other computing device capable of processing natural language requests. As shown in FIG. 1, the illustrative computing device 102 includes a processor 120, an I/O subsystem 122, memory 124, and a data storage device 126. Of course, the computing device 102 may include other or additional components, such as those commonly found in a portable computer (e.g., various input/output devices), in other embodiments. Additionally, in some embodiments, one or more of the illustrative components may be incorporated in, or otherwise from a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store input natural language requests, sample requests, statistical information, or other data used for natural language processing.

The computing device 102 further includes communication circuitry 128, which may be embodied as any communication circuit, device, or collection thereof, capable of enabling communications between the computing device 102, the client device 104, and/or other remote devices. The communication circuitry 128 may be configured to use any one or more communication technology (e.g., wireless or wired communications) and associated protocols (e.g., Ethernet, Bluetooth®, Wi-Fi®, WiMAX$_n$ etc.) to effect such communication.

In some embodiments, the computing device 102 may also include one or more peripheral devices 130. The peripheral devices 130 may include any number of additional input/output devices, interface devices, and/or other peripheral devices. For example, the peripheral devices 130 may include typical input/output devices such as a display, keyboard, and/or touchscreen, location circuitry such as GPS receivers, or other peripheral devices.

In those embodiments in which the system 100 includes the client device 104, the client device 104 is configured to submit natural language requests to the computing device 102. The client device 104 may be embodied as any type any type of device capable of performing the functions described herein, such as, without limitation, a smartphone, a cellular phone, a tablet computer, a notebook computer, a laptop computer, a desktop computer, a consumer electronic device, an in-vehicle infotainment system, a wearable computing device, a smart appliance, and/or any other computing device capable of submitting natural language requests. Illustratively, the client device 104 includes a processor 140, an I/O subsystem 142, memory 144, a data storage device 146, communication circuitry 148, peripheral devices 150, and/or other components and devices commonly found in a smartphone or similar computing device. The individual components of the client device 104 may be similar to the corresponding components of the computing device 102, the description of which is applicable to the corresponding components of the client device 104 and is not repeated herein so as not to obscure the present disclosure. Additionally, FIG. 1 illustrates a single client device 104, it should be appreciated that in some embodiments multiple client devices 104 may access the computing device 102 through the network 106.

As discussed in more detail below, the computing device 102 and the client device 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications among the devices of the system 100.

Figure 2:
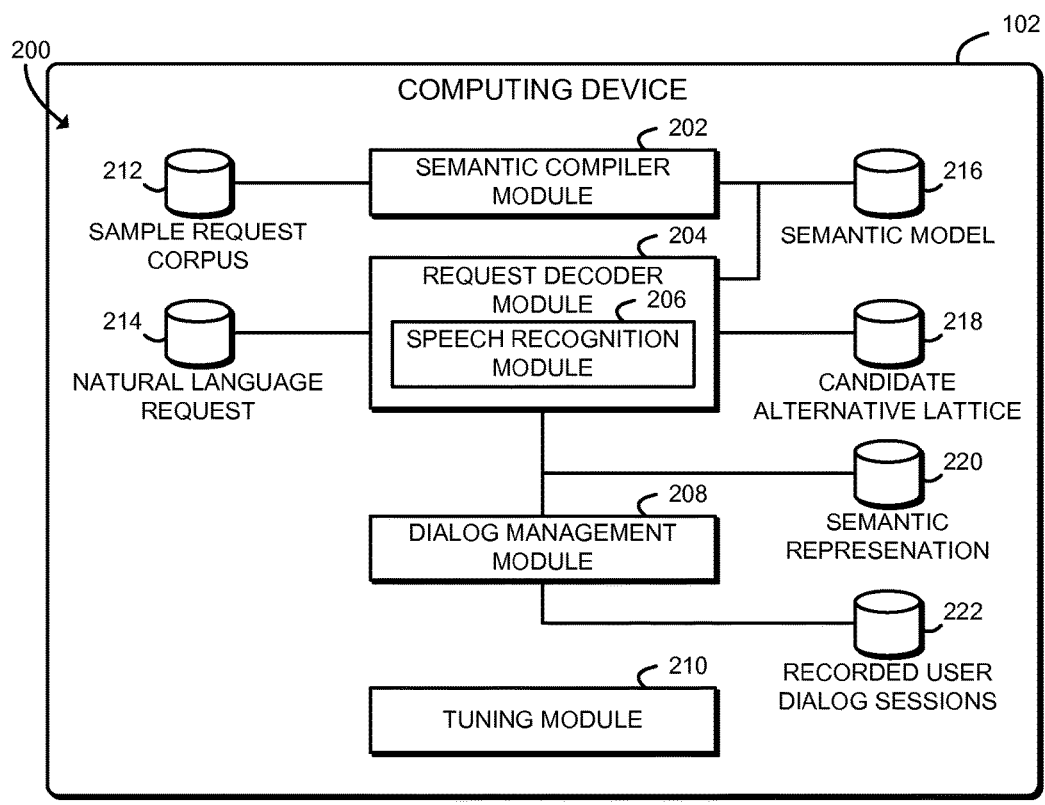
FIG. 2 is a simplified block diagram of at least one embodiment of an environment of a computing device of FIG. 1.

Referring now to FIG. 2, in the illustrative embodiment, the computing device 102 establishes an environment 200 during operation. The illustrative environment 200 includes a semantic compiler module 202, request decoder module 204, dialog management module 208, and tuning module 210. The various modules of the environment 200 may be embodied as hardware, firmware, software, or a combination thereof.

The semantic compiler module 202 is configured to analyze a sample request corpus 212 and generate a semantic model 216 as a function of the sample request corpus 212. The sample request corpus 212 may be embodied as any predefined collection of user requests and/or other recorded user interactions. For example, the sample request corpus 212 may include a large web corpus of sample web pages or other interactions. Additionally, or alternatively, the sample request corpus 212 may include a highly-specified database, ontology, or catalog scheme. In some embodiments, sample request corpus 212 may include user-specified information, such as personal messages, calendars, contacts, or other information. The semantic model 216 may include mappings between natural language requests 214 or certain forms of natural language requests 214 and semantic representations 220 of the natural language requests 214. The semantic representations 220 may identify user intents (such as particular intended actions or interactions) and slots associated with the user intents. The slots may include parameters, fields, options, or other data associated with a particular user intent. The semantic compiler module 202 may generate the semantic model 216 in an offline manner; that is, prior to the computing device 102 processing any live natural language requests 214 from users.

The request decoder module 204 is configured to decode a natural language request 214 using the semantic model 216, and generate a semantic representation 220 corresponding to the natural language request 214. The request decoder module 204 statistically identifies the intent of a given natural language request 214 and extracts the relevant slots from the natural language request 214. The request decoder module 204 may generate a candidate alternatives lattice 218 indicative of the natural language request 214, assign a composite confidence weight to each candidate alternative of the lattice 218, determine an optimal route through the lattice 218 based on the weighting, and generate the semantic representation 220 based on the optimal route through the lattice 218. Each candidate alternative of the lattice 218 may represent an alternative representation of a token, word, or other fragment of the natural language request 214. The request decoder module 204 may employ a highly productive generation function to generate a large diversity of candidate alternatives based on similarity, pattern matching, or other statistical operations using the semantic model 216, as well as based on phonetic similarity, linguistic fluency, or other operations using a language model. In some embodiments, the request decoder module 204 may convert a spoken natural language request 214 into a textual representation. The request decoder module 204 may generate a lattice of potential textual representations of the natural language request 214. In some embodiments, those functions may be performed by a sub-module, such as a speech recognition module 206.

The dialog management module 208 is configured to process the semantic representation 220 to perform a user dialog session. Each user dialog session may include one or more user requests, responses, actions or intents performed, or other user dialog interactions. In some embodiments, the dialog management module 208 may maintain recorded user dialog sessions 222, which may store information on past user dialog sessions. The dialog management module 208 may determine whether the semantic representation 220 includes sufficient information to perform the natural language request 214. If sufficient information exists, the dialog management module 208 may perform the request (e.g., perform a requested user intent, generate a requested response, etc.). If sufficient information does not exist, the dialog management module 208 may generate a response including a query for additional information. The dialog management module 208 may generate natural language responses using the semantic model 216, for example, modifying the response to be in interrogative or imperative form. The dialog management module 208 may identify additional user intents that are likely to follow the intent of the current semantic representation 220, based on the recorded user dialog sessions 222. A method for user dialog session management is described further below in connection with FIG. 10.

The tuning module 210 is configured to update the semantic model 216 and/or other parameters of the semantic compiler module 202, the request decoder module 204, and/or the dialog management module 208 in response to processing natural language requests 214. The tuning module 210 may automatically refine semantic model 216 mappings, confidence weightings, candidate alternative generation thresholds, dialog trajectories, or other configuration parameters of the computing device 102. In some embodiments, the tuning module 210 may update the semantic model 216 and/or other parameters based on additional sample data provided by a user such as a system administrator. In some embodiments, the tuning module 210 may allow a system administrator to perform interactive analysis and/or tuning of the computing device 102. A method analyzing and tuning natural language processing is described further below in connection with FIG. 11.

Figure 3:
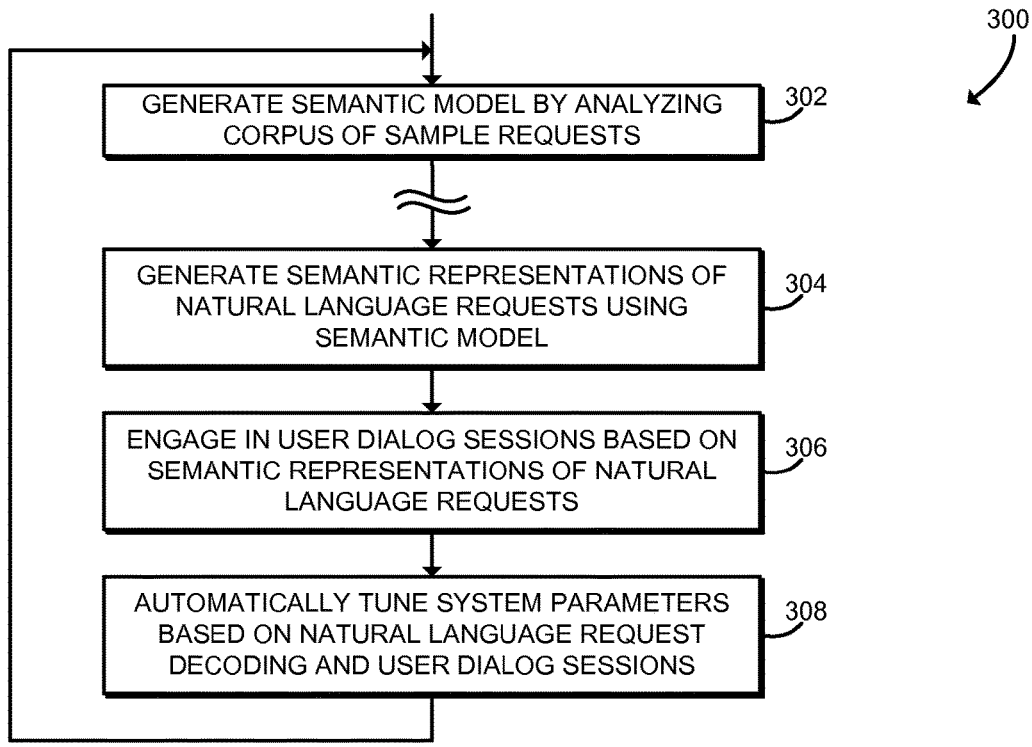
FIG. 3 is a simplified flow diagram of at least one embodiment of a method for self-learning natural language processing that may be executed by the computing device of FIGS. 1 and 2.

Referring now to FIG. 3, in use, the computing device 102 may execute a method 300 for natural language request processing. The method 300 begins with block 302, in which the computing device 102 generates the semantic model 216 by analyzing the sample request corpus 212. The computing device 102 may analyze the sample request corpus 212 in an offline manner; that is, the computing device 102 may analyze the sample request corpus 212 prior to processing any natural language requests 214. The computing device 102 may analyze the sample request corpus 212 using any statistical or machine learning algorithm useable to prepare the semantic model 216 for natural language processing. As described above, the semantic model 216 includes mappings between forms of natural language requests 214 onto various user intents and associated slots. For example, the semantic model 216 may map a natural language request 214 such as "I'd like to order 2 tickets to see Movie Title this evening" onto a "ticket-reservation" user intent with a "ticket quantity" slot equal to 2, a "move name" slot equal to "Movie Title," and a "time" slot equal to "this evening." Similarly, a natural language request 214 such as "Get me 2 seats for Movie Title at 7 p.m." may map onto the same "ticket-reservation" user intent, with the "ticket quantity" slot equal to 2, the "movie name" slot equal to "Movie Title," and the "time" slot equal to "7 p.m." Methods for generating the semantic model 216 are described further below in connection with FIGS. 4-7.

After some time, the method 300 proceeds to block 304, in which the computing device 102 generates semantic representations 220 corresponding to natural language requests 214, using the semantic model 216 generated previously. The semantic representations 220 generated each identify a user intent corresponding to the natural language request 214, and may also identify a number of slots corresponding to parameters or other data relevant to the user intent. The computing device 102 generates the semantic representation 220 by generating a lattice 218 of candidate alternative interpretations of the natural language request 214. Each candidate alternative may be generated based on any combination of semantic, lexical, or phonetic analysis of the natural language request 214 and/or of other candidate alternatives of the lattice 218. A method for generating the candidate alternative lattice 218 and generating the semantic representation 220 is described further below in connection with FIG. 8.

In block 306, the computing device 102 engages in a user dialog sessions based on the semantic representations 220 of the natural language requests 214. The particular action and/or response taken by the computing device 102 may depend on the contents of the semantic representations 220 and/or on the contents of the recorded user dialog sessions 222. For example, if a semantic representation 220 fully describes a user intent and all of its mandatory slots, the computing device 102 may perform an action associated with the user intent (e.g., schedule a meeting). If the semantic representation 220 does not fully describe the user intent, the computing device 102 may produce a list of possible responses that is limited by some relevancy factor (e.g., distance, price, etc.). As another example, if the semantic representation 220 does not fully describe the user intent, the computing device 102 may generate a request for additional information. In some embodiments, the computing device 102 may determine a likely additional user intent based on the recorded user dialog sessions 222 and generate a response that suggests that additional user intent. A method for user dialog session management is described further below in connection with FIG. 10.

In block 308, the computing device 102 automatically tunes system parameters based on the decoding of the natural language request 214 and/or on the recorded user dialog sessions 222. The computing device 102 may, for example, adjust scores, probability weights, thresholds, or other parameters used when generating the semantic model 216, the candidate alternative lattice 218, and/or the semantic representation 220. The computing device 102 may also alter the trajectory of user dialogs based on the recorded user dialog sessions 222. After tuning the system, the method 300 may loop back to block 302 to re-generate the semantic model 216.

Although illustrated as proceeding sequentially, it should be understood that the processes described in FIG. 3 may be performed at different times or in other orders, for example in parallel or asynchronously. For example, the semantic model 216 may be generated and/or updated by an offline process independent of processing the natural language requests 214. Additionally, user dialog sessions may iteratively decode and act on natural language requests 214 without tuning the system or regenerating the semantic model 216. Similarly, the system may be tuned by a process independent of processing natural language requests 214 and/or generating the semantic model 216.

Figure 4:
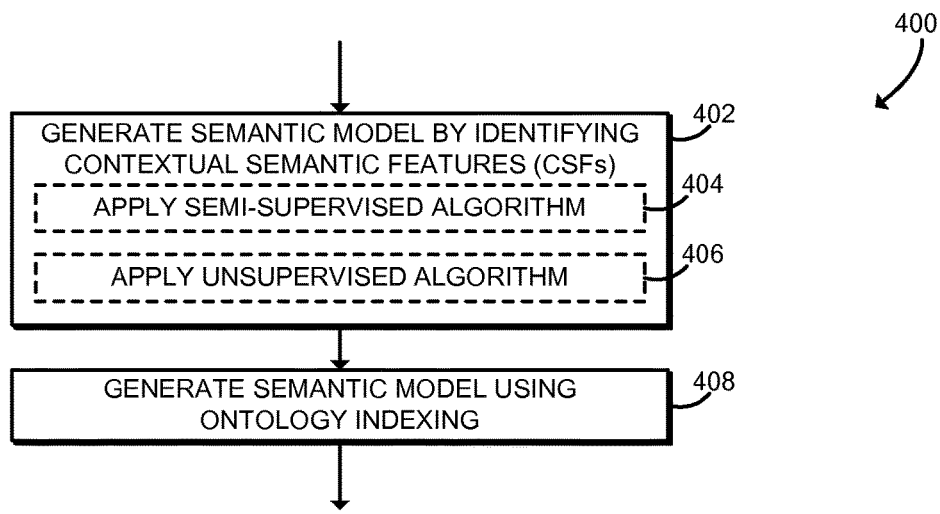
FIG. 4 is a simplified flow diagram of at least one embodiment of a method for generating a semantic model that may be executed by the computing device of FIGS. 1 and 2.

Referring now to FIG. 4, in use, the computing device 102 may execute a method 400 for generating the semantic model 216. The method 400 may be executed, for example, as part of block 302 as described above in connection with FIG. 3. The method 400 begins with block 402, in which the computing device 102 generates the semantic model 216 by identifying one or more contextual semantic features (CSFs) in the sample request corpus 212. The CSFs may include one or more contextual semantic intent features (CSIFs). Each CSIF may be defined as a sequence of lexical or phrasal sets that identifies a specific intent along with its slots. CSIFs may not be limited to closed lexical sets, and may be defined using open-ended lexical sets as well as semantically synonymous phrases. Open lexical sets may be generated using general entity and relation extractors as well as content databases such as catalogues, and synonymous phrases may be generated using rephrasing data sources such as thesauri. For example, a CSIF may be defined as (order-verb, ticket-object, for-relation, <Movie>, Time). That CSIF may be associated with the "ticket-reservation" user intent, and may match natural language requests 214 such as "I'd like to order 2 tickets to see Movie Title this evening." The identified CSFs may also include one or more contextual semantic slot features (CSSFs). Each CSSF may be defined as a sequence of lexical or phrasal sets identifying a specific slot-family without regard to intent.

In some embodiments, in block 404 the computing device 102 may apply a semi-supervised algorithm to identify CSFs. The semi-supervised algorithm may process entries in the sample request corpus 212 or other data that has been manually tagged to identify CSFs. One method for applying a semi-supervised algorithm is described below in connection with FIG. 5. Additionally or alternatively, in some embodiments in block 406, the computing device 102 may apply an unsupervised algorithm to identify CSFs. The unsupervised algorithm may identify CSFs without requiring manual identification of CSFs in the sample request corpus 212 or other data. One method for applying an unsupervised algorithm is described below in connection with FIG. 6.

In block 408, the computing device 102 generates the semantic model 216 by indexing one or more ontology. An ontology may be embodied as a formal representation of a specific domain or family of domains given by a graph, or an alternate data structure, comprising objects, properties, entities, relations between objects, relations between entities, and relations between relations (higher-order relations) as well as taxonomies of objects. Thus, an ontology may reflect the sum of knowledge embodied in a domain or family of domains. The computing device 102 may index the ontology such that the ontology may be searched and matched against a natural language request 214. At least one embodiment of a method for ontology indexing is described further below in connection with FIG. 7.

After generating the semantic model 216 in block 408, the method 400 is completed, and the semantic model 216 is complete and may be used to process natural language requests 214. Although illustrated as both identifying CSFs and performing ontology indexing, it should be understood that in some embodiments the computing device 102 may perform one or both of those operations, and in any order. In addition to ontology indices and CSFs, the computing device 102 may also learn generic terms that may serve as fillers inconsequential to query understanding, e.g., terms such as "please," "I'd like to," "can I," and other similar phrases. Such generic terms may be used to both hone the CSFs and weighting schemes employed by ontology indices, as well as generate a large corpus of natural queries based on seed or sample queries for use by all modules of the computing device 102.

Figure 5:
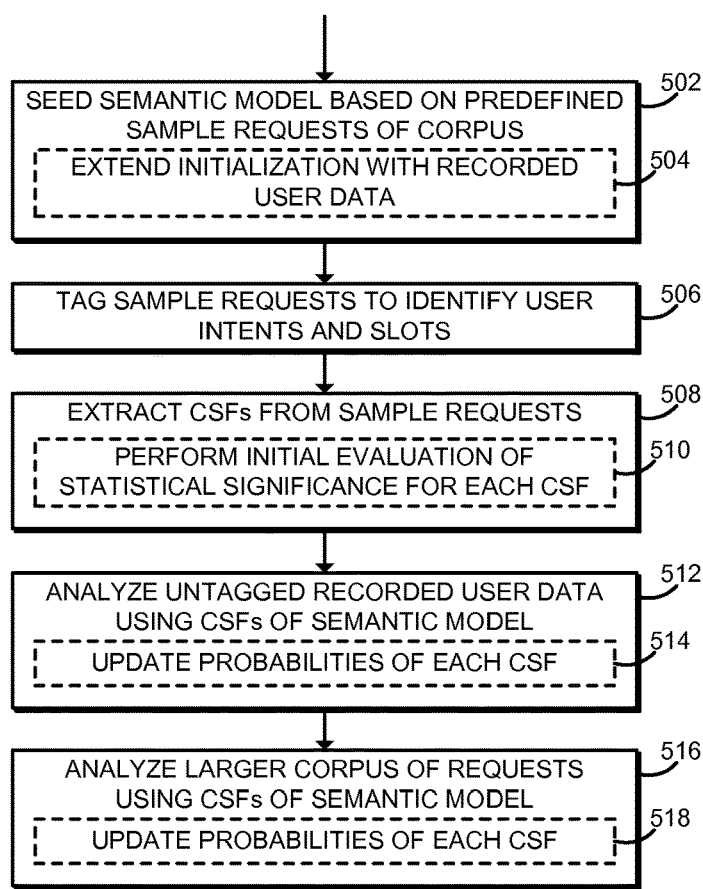
FIG. 5 is a simplified flow diagram of at least one embodiment of a method for semi-supervised identification of contextual semantic features that may be executed by the computing device of FIGS. 1 and 2.

Referring now to FIG. 5, in use, the computing device 102 may execute a method 500 for applying a semi-supervised algorithm to generate the semantic model 216. The method 500 may be executed, for example, as part of block 404 as described above in connection with FIG. 4. The method 500 begins with block 502, in which the computing device 102 seeds the semantic model 216 based on predefined requests within the sample request corpus 212. In some embodiments, in block 504 the computing device 102 may extend the initialization using recorded user data. For example, the computing device 102 may also process user-generated data and history including contacts, meetings, calendar, text messages, emails, and documents. In some embodiments, the computing device 102 may process the recorded user dialog sessions 222, which may be used to learn the relative weight of slots for each user intent. In block 506, the computing device 102 tags the sample requests to identify associated user intents and slots. The tag information may be provided by a user or other external data source. Thus, tagging process may be a supervised or semi-supervised process.

In block 508, the computing device 102 extracts CSFs from the tagged sample requests. As described above, for each CSF the computing device 102 may identify a sequence of lexical or phrasal sets. The computing device 102 may associate a user intent with the CSF, and may associate one or more slots with the lexical or phrasal sets of the CSF. For example, given a sample request, "I want to meet John tomorrow about the latest numbers," the computing device 102 may extract a CSF=(meet-verb, <Person>, <Time>, about <Topic>). As another example, given a sample request, "Please set an appointment with Mary at 5 p.m. to discuss the latest numbers," the computing device 102 may extract a CSF=(appointment with, <Person>, at <Time>, to discuss <Topic>). Both of those extracted CSFs may be associated with an "appointment" or "meeting" user intent, as well as a number of slots for person, time, or topic.

In some embodiments, in block 510, the computing device 102 may perform an initial evaluation of statistical significance for each CSF. The computing device 102 may perform any statistical operation to determine the relative level to which the CSF serves as an indication for the associated user intent and/or slot. For example, the computing device 102 may calculate the frequency of each CSF per user intent. Additionally or alternatively, the computing device 102 may calculate a normalized frequency measuring the statistical significance of a given CSF an indication of a specific user intent and/or slot relative to the sample request corpus 212. Similarly, for each user intent, slots may be weighted differently according to occurrence frequency, producing a distinction between mandatory, preferred, and optional slots for the associated user intent.

In block 512, after analyzing the tagged sample requests, the computing device 102 analyzes untagged recorded user data using the CSFs already identified in the semantic model 216. The untagged user data may be embodied as any natural language input (e.g., speech or text input) provided by the user. As the user data is untagged, the user is not required to further identify intents and/or slots. The computing device 102 may extract additional CSFs from the untagged recorded user data based on similarity to existing CSFs. Continuing the previous example described above, given untagged user data, "I want to meet John tomorrow to discuss the latest numbers," the computing device 102 may extract a CSF=(meet-verb, <Person>, <Time>, to discuss <Topic>). In some embodiments, in block 514 the computing device 102 may update probabilities associated with each CSF in the semantic model 216, including previously identified CSFs, for example CSFs extracted from the tagged sample requests. For example, the computing device 102 may update the frequencies of each CSF per user intent and/or update the normalized frequency for each CSF.

In block 516, the computing device 102 analyzes a larger, untagged corpus of requests using the CSFs already identified in the semantic model 216. For example, the computing device 102 may analyze the full sample request corpus 212, a large web corpus, a user-defined ontology, a user database, or other relatively large data source. In some embodiments, in block 518 the computing device 102 may update the probabilities associated with each CSF in the semantic model 216, including previously identified CSFs. Analyzing the larger corpus may allow the computing device 102 to refine CSF contents and probabilities, to improve accuracy. For example, in the example described above, given untagged user data, "I want to meet John at about 7 a.m.," the computing device 102 may extract an erroneous CSF= (meet-verb, <Person>, <Time>, at about <Topic>). Analysis of the larger corpus, such as a web corpus, may reveal that "at about" signifies a time relationship. Thus, after analyzing the larger corpus, that CSF may be modified or replaced with CSF=(meet-verb, <Person>, <Time>, at about <Time>).

As shown in FIG. 5, after completing the analysis of the larger corpus, the method 500 is complete. In some embodiments, rather than complete the method 500, the computing device 102 may continue to extract CSFs from larger corpora. For example, in some embodiments the method 500 may repeat the operations of block 516 for different corpora.

Figure 6:
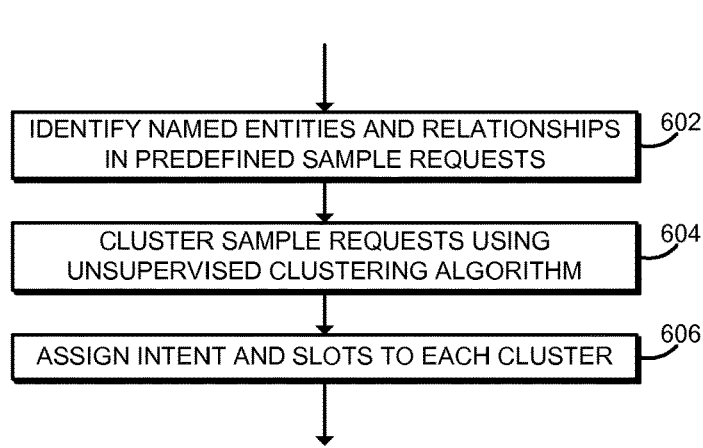
FIG. 6 is a simplified flow diagram of at least one embodiment of a method for unsupervised identification of contextual semantic features that may be executed by the computing device of FIGS. 1 and 2.

Referring now to FIG. 6, in use, the computing device 102 may execute a method 600 for applying an unsupervised algorithm to generate the semantic model 216. The method 600 may be executed, for example, as part of block 406 as described above in connection with FIG. 4. The method 600 begins with block 602, in which the computing device 102 identifies named entities and relationships in the predefined sample request corpus 212. The computing device 102 may apply a number of named entity and relation extractors to analyze the sample request corpus 212. The computing device 102 may identify the named entities and relationships without requiring manual tagging of the sample request corpus 212.

In block 604, the computing device 102 clusters the sample requests according to entity and relation patterns using one or more unsupervised clustering algorithms. For example, the computing device 102 may employ k-means clustering or any other unsupervised clustering algorithm In block 606, the computing device 102 assigns a user intent and one or more slots to each cluster of sample requests. For example, a number of sample requests sharing a "meet" verb as well as <Person>, <Time>, and <Topic> entities may be clustered and assigned to a specific user intent. After assigning user intent and slots, the method 600 is completed.

Figure 7:
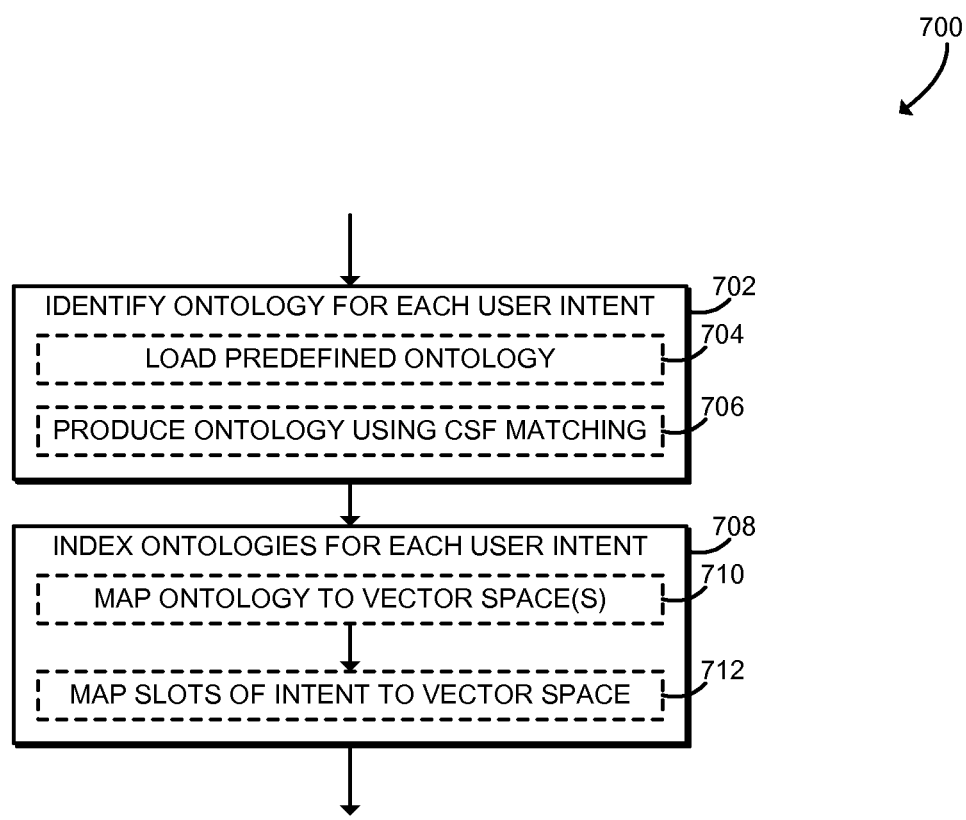
FIG. 7 is a simplified flow diagram of at least one embodiment of a method for ontological indexing that may be executed by the computing device of FIGS. 1 and 2.

Referring now to FIG. 7, in use, the computing device 102 may execute a method 700 for indexing one or more ontologies to generate the semantic model 216. The method 700 may be executed, for example, as part of block 408 as described above in connection with FIG. 4. The method 700 begins with block 702, in which the computing device 102 loads an ontology for each user intent. As described above, each ontology may be embodied as a formal representation of a specific domain or family of domains given by a graph, or an alternate data structure, comprising objects, properties, entities, relations between objects, relations between entities, and relations between relations (higher-order relations) as well as taxonomies of objects. In some embodiments, in block 704, the computing device 102 may load a predefined ontology. The predefined ontology may be a specialized ontology supplied by a user, a general ontology supplied by a third party, or any other predefined ontology. In some embodiments, in block 706 the computing device 102 may produce an ontology using CSF matching. Thus, additional ontologies may be generated by the computing device 102 on an ongoing basis. For example, an ontology representing "movie theaters" may be constructed by analyzing CSFs related to the domain "movie ticket ordering."

In block 708, the computing device 102 indexes the ontologies for each user intent. The computing device 102 may index the ontology in any manner that may be later searched and matched against natural language requests 214. For example, the ontologies may be indexed into one or more vector spaces that may be searched by finding a nearest neighbor match. In some embodiments, in block 710 the computing device 102 may map an ontology onto one or more vector spaces. The computing device 102 may assign a vector space $V^d$ to each object-type of the ontology (i.e. entities, relations, properties, etc.). Each coordinate 1, . . . , d may encode a token in the lexical string representing the relevant object, property, or relation. As further described below, a natural language request 214 may be evaluated by mapping the natural language request 214 onto the same vector space and finding the ontology with the closest vectors in each vector space. In block 712, the computing device 102 may map slots associated with the user intent of the ontology to the vector space. Thus, after determining the closest-matching vectors, the computing device 102 may identify the user intent and slots associated with the natural language request 214.

Figure 8:
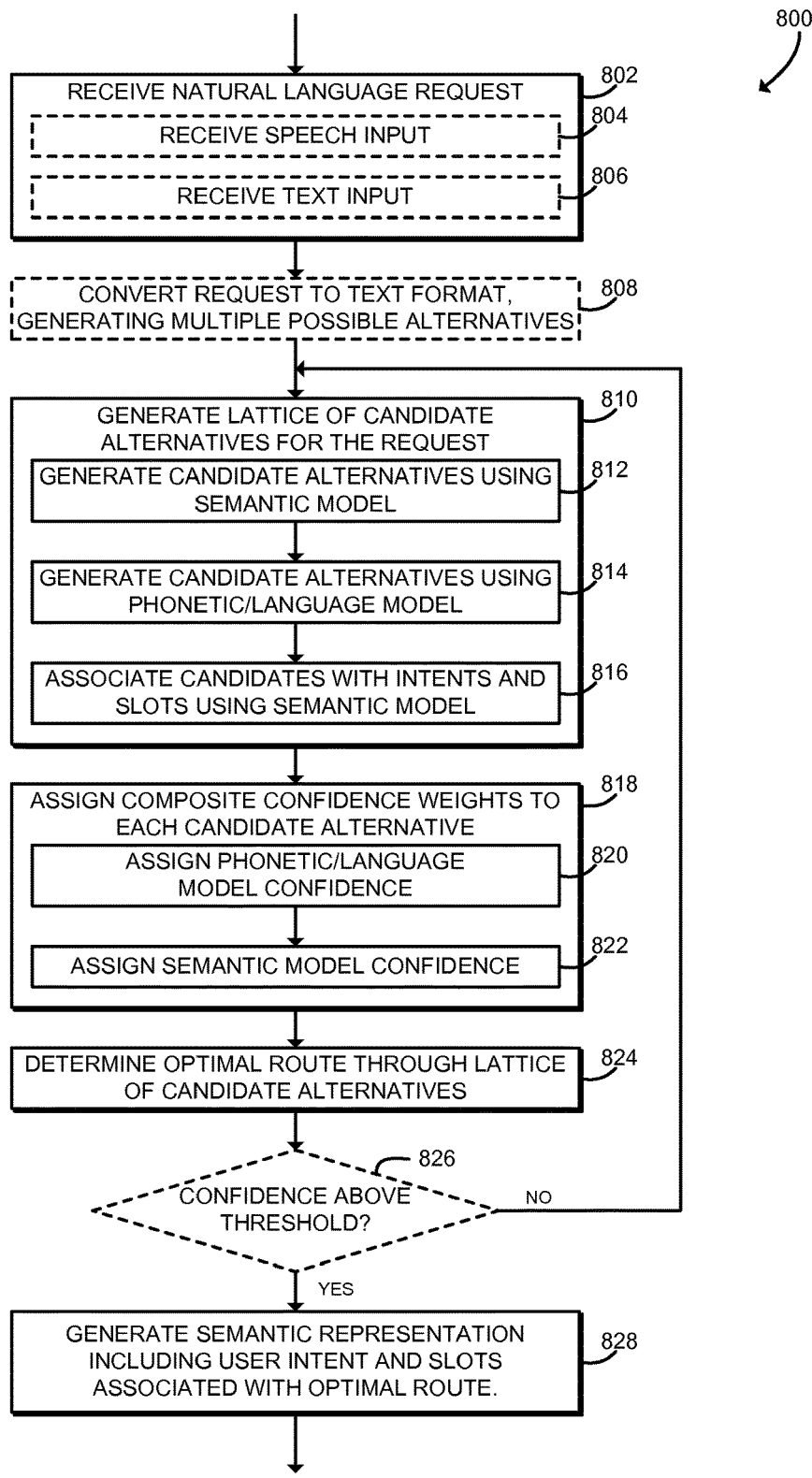
FIG. 8 is a simplified flow diagram of at least one embodiment of a method for processing a natural language request that may be executed by the computing device of FIGS. 1 and 2.

Referring now to FIG. 8, in use, the computing device 102 may execute a method 800 for processing a natural language request 214. The method 800 may be executed, for example, as part of block 304 as described above in connection with FIG. 3. The method 800 begins with block 802, in which the computing device 102 receives a natural language request 214. The computing device 102 may receive the natural language request 214 directly from a user, for example using a peripheral device such as a keyboard, touch screen, or microphone. Additionally or alternatively, the computing device 102 may receive the natural language request 214 from a remote device such as a client device 104 via the network 106. In some embodiments, in block 804 the computing device 102 may receive speech input. The speech input may be embodied as raw audio data, compressed audio data, or any other representation of speech uttered by the user. In some embodiments, in block 806 the computing device 102 may receive text input, for example entered by the user via a keyboard or touchscreen.

In some embodiments, in block 808, the computing device 102 may convert the natural language request 214 from speech format to text format. Rather than a single text interpretation of the speech input, the computing device 102 may generate a lattice of potential text interpretations of the speech input. The computing device 102 may use any speech recognition engine or other technique for speech recognition including, for example, weighted finite state transducers or neural networks. The speech recognition engine may incorporate large beam width; that is, alternatives may not be pruned aggressively, so the resultant lattice of potential candidates may include many possible alternatives. The speech recognition engine may include promiscuous phonetic modeling, such as a lexicon represented by relaxed phonetic mappings that account for foreign accent variations, ambiguous pronunciations, and noisy environments, and other phonetic alternatives to further expand the set of potential alternatives. The speech recognition engine may use both a generic large web-based language model (LM) and/or domain-specific LMs constructed to optimally represent a specific domain of knowledge. Knowledge domains may include user-generated data such as personal data, contacts, meetings, text messages, emails, social postings, or other documents. Generic and domain-specific LMs may be combined into a domain-biased generic web-based LM by taking the union of sentences containing words or stemmed words that are either manually or automatically selected as representing functional or content words of a given domain. In some embodiments, the speech recognition engine may create a class-based general LM, for example by using class tags and collapsing most frequent instances of a class to a class tag, replacing class members in the corpus by class tags, or by normalizing class members to a single representative. The classes may represent lists of entities that are dynamically gathered and originate from user-specific data such as names of contacts, emails, or similar user data. Generic and domain-specific LMs may be combined using a machine learned weighting scheme and trained smoothing language models (e.g., the Kneser-Ney algorithm) to optimize lattice scores for both domain-specific and general queries. As described further below in connection with FIG. 11, parameters of the speech recognition engine may be tuned automatically based on result history.

In block 810, the computing device 102 generates the candidate alternative lattice 218 that includes multiple potential alternative representations of the natural language request 214. The computing device 102 uses several different data sources and techniques to generate the candidate alternatives. In block 812, the computing device 102 generates candidate alternatives using the semantic model 216. The computing device 102 may generate alternatives based on potential mappings between candidate alternatives and user intents or slots. For example, the computing device 102 may generate candidate alternatives based on the sequence of lexical sets of a CSF included in the semantic model 216, or based on an ontology indexed in the semantic model 216.

As described above, an ontology $X_n$ may be indexed in the semantic model 216 by assigning a vector space $V^d$ to each object type of the ontology $X_n$. To identify candidate alternatives, the natural language request 214 may be deciphered by representing the natural language request 214 as a vector of tokens according to the same scheme used for indexing the ontology $X_n$. The computing device 102 may find the ontology $X_n$ with closest vectors in each vector space, $V_{n,1}^{d(n,1)}, \ldots, V_{n,m}^{d(n,m)}$. Since ontologies represent user intents, and the indexed vector spaces represent respective slots, finding a closest match, or set of nearest neighbors, returns the intent and slots most accurately represented by the natural language request 214. Note that closest match may be defined using various metrics and measurements, one example being cosine similarity over a Euclidean space. The exact metrics, measurements and weights assigned to similarity scores may be learned and optimized using machine learning algorithms such as logistic regressions, support vector machines, or conditional random fields. In some embodiments, standard classification methods (for example, using support vector machines with term frequency/inverse document frequency of tokens as features) may be used to deduce the relevant user intent, and ontology indexing methods may be applied for extraction of slots.

In block 814, the computing device 102 generates candidate alternatives using a phonetic or language model. In other words, the computing device 102 may generate candidate alternatives that sound similar to existing alternatives, are syntactically correct, or are linguistically fluent based on existing candidate alternatives. For example, the computing device 102 may generate phonetically enriched candidates based on either a general or domain-specific LM or user-history generated LM. Additionally or alternatively, the computing device 102 may perform any other technique to enrich the candidate alternative lattice 218. For example, the computing device 102 may generate additional candidate alternatives using semantic enrichments including synonyms, paraphrases, stemming, and generalizations; contextual feature sequences including n-grams, switch-grams, skip-grams, colocation frequencies, and normalized frequencies; entity and relation based features; or generic fillers that do not affect intent and slots (e.g., "please," "can I," etc.). In block 816, the computing device 102 annotates the candidate alternative lattice 218 to associate candidate alternatives with particular intents and/or slots using the semantic model 216. For example, the computing device 102 may assign intents and/or slots based on the degree of matching with CSFs or ontology indexes of the semantic model 216.

In block 818, the computing device 102 assigns composite confidence weights to each candidate alternative in the candidate alternatives lattice 218. Each composite confidence weight represents the likelihood that that candidate alternative correctly represents the natural language request 214. The composite confidence weights are based on several measures, including phonetic, linguistic, and/or semantic confidence. In block 820, the computing device 102 assigns a phonetic/language model confidence to each candidate alternative. For example, the computing device 102 may assign a phonetic similarity value, a general LM confidence value; a domain LM confidence value, or a local and non-local syntactic confidence value. In block 822, the computing device 102 assigns a semantic model confidence to each candidate alternative. For example, the computing device 102 may assign an intent-and-slot based confidence value. That confidence value may be determined, for example, based on the probabilities of the associated CSF in the semantic model 216, or on the degree of matching to an ontological index in the semantic model 216, or on any other statistical data available from the semantic model 216. The weights may be calculated taking into consideration full or partial matching, synonym or homophone matching, content or non-content generation, and the strength of the relevant contextual feature.

Figure 9:
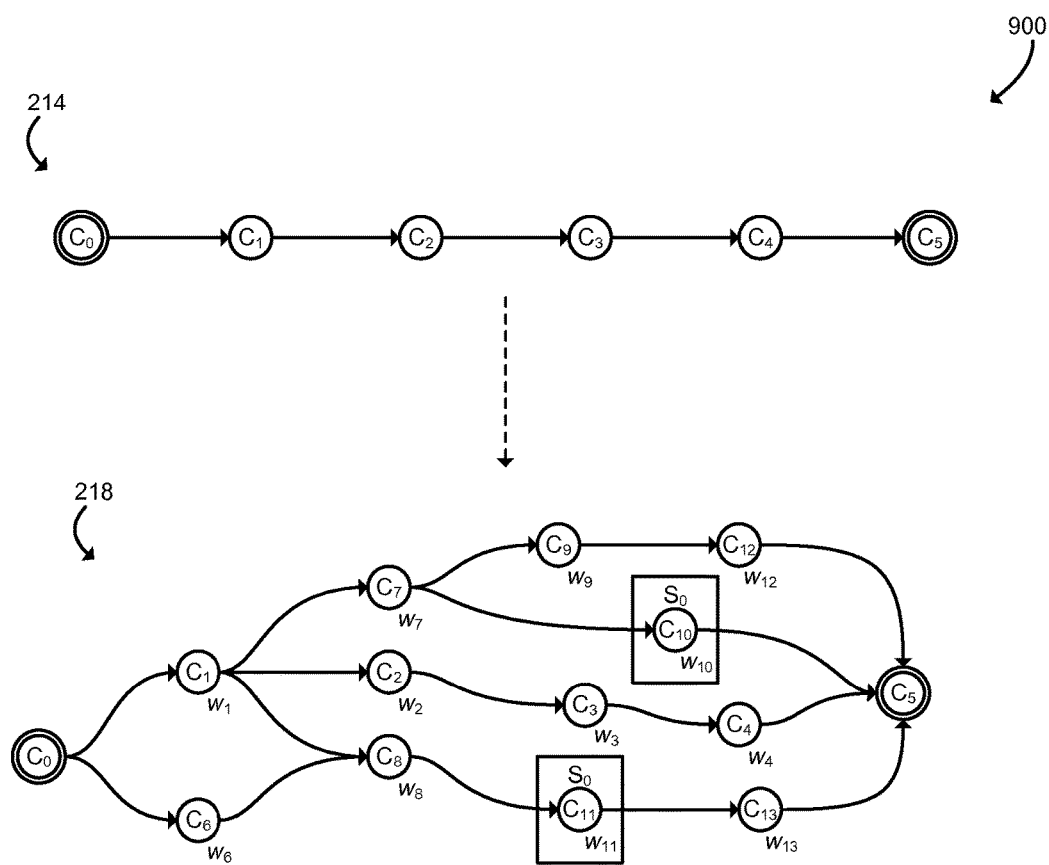
FIG. 9 is a schematic diagram illustrating a candidate alternative lattice that may be generated by the computing device of FIGS. 1 and 2.

Referring now to FIG. 9, the schematic diagram 900 illustrates generation of the candidate alternatives lattice 218. The diagram 900 illustrates a natural language request 214 that is received from the user. As described above, the natural language request 214 may be received as text or speech data. After any necessary input processing, the natural language request 214 is represented as a set of candidate alternatives $C_0$ through $C_5$. In the illustrative example, the candidate alternatives $C_0$, $C_5$ represent the beginning and end of the natural language request 214, respectively. The candidate alternatives $C_1$ through $C_4$ represent the output of speech recognition performed on the input natural language request 214. For example, the candidate alternatives ($C_1$, $C_2$, $C_3$, $C_4$) may be embodied as ("I", "won a", "humble", "girl").

As shown, the input natural language request 214 is enhanced to generate the candidate alternatives lattice 218. As shown, additional candidate alternatives $C_6$ through $C_{13}$ have been added to the lattice 218. Additionally, each of the candidate alternatives (other than the beginning and end) has been assigned a composite confidence weight $w_i$. Further, the candidate alternatives $C_{10}$ and $C_{11}$ have both been associated with a slot $S_0$ of the semantic model 216. Thus, the relative weights of those candidate alternatives may affect what interpretation of the slot value is used. To illustrate the lattice enhancement, Table 1, below, lists potential natural language tokens that may be associated with each candidate alternative. As shown, in the illustrative candidate alternatives lattice 218, the slot $S_0$ may be represented by the candidate alternatives $C_{10}$ ("hamburger") or $C_{11}$ ("ham and"). For example, the slot $S_0$ may be a "dish" slot associated with a food-ordering user intent.

TABLE 1

Example text for candidate alternatives lattice

| Candidate Alternative | Token |
|---|---|
| $C_0$ | <start> |
| $C_1$ | I |
| $C_2$ | won a |
| $C_3$ | humble |
| $C_4$ | girl |
| $C_5$ | <stop> |
| $C_6$ | <silence> |
| $C_7$ | want a |
| $C_8$ | wanna |
| $C_9$ | humble |
| $C_{10}$ | hamburger |
| $C_{11}$ | ham and |
| $C_{12}$ | girl |
| $C_{13}$ | gill |

Referring back to FIG. 8, after building and enhancing the candidate alternatives lattice 218, in block 824 the computing device 102 determines an optimal route through the lattice 218. The computing device 102 may determine the optimal route by finding the path of candidate alternatives having the greatest combined confidence weight. The computing device 102 may use any appropriate pathfinding or optimization algorithm to find the optimal route. For example, the computing device 102 may, for each candidate alternative of the lattice 218, calculate a normalized score which is not sensitive to the intent and slots and/or calculate local scores assigned to each intent and slot when the candidate alternative is generated. The computing device 102 may also calculate a query and intent coverage score, that is, a score reflecting the degree to which relevant slots are represented in the lattice 218 for a given natural language request 214 (for example, if all mandatory slots for a given intent are covered by a candidate route on the lattice 218, that route will receive a higher score than if not all mandatory slots are covered).

For example, referring again to FIG. 9, Table 2, below, includes illustrative composite confidence weight values $w_i$ associated with each candidate alternative $C_i$. In that example, the path ($C_0$, $C_1$, $C_7$, $C_{10}$, $C_5$) corresponding to "I want a hamburger" may be the optimal route through the candidate alternatives lattice 218.

TABLE 1

Example text for candidate alternatives lattice

| Composite Weight | Value |
|---|---|
| $w_1$ | 0.012 |
| $w_2$ | 0.004 |
| $w_3$ | 0.005 |
| $w_4$ | 0.006 |
| $w_5$ | N/A |
| $w_6$ | 0.009 |
| $w_7$ | 0.023 |
| $w_8$ | 0.008 |
| $w_9$ | 0.003 |
| $w_{10}$ | 0.019 |
| $w_{11}$ | 0.014 |
| $w_{12}$ | 0.006 |
| $w_{13}$ | 0.006 |

Referring back to FIG. 8, after determining the optimal route through candidate alternatives lattice 218, in block 826, in some embodiments, the computing device 102 may determine whether the confidence score of the optimal route exceeds a predefined threshold confidence score. If not, the method 800 loops back to block 810 to generate additional candidate alternatives, re-weight the candidate alternatives, and re-find the optimal route. If the confidence score exceeds the threshold, the method 800 proceeds to block 828.

In block 828, the computing device 102 generates a semantic representation 220 corresponding to the optimal route through the candidate alternatives lattice 218. As described above, the semantic representation 220 includes a user intent and zero or more slots. The slots may be mapped to particular tokens, text, or other values associated with the one of the candidate alternatives lattice 218. After generating the semantic representation 220, the method 800 is completed, and processing of the natural language request 214 may continue. In some embodiments, some or all of the slots may not be mapped to any tokens or other values. As further described below, in those embodiments, the computing device 102 may prompt the user for values associated with un-mapped or missing slots. As an example of generating a semantic representation 220, and referring again to FIG. 9, in the illustrative embodiment, the optimal route through the candidate alternatives lattice 218 may be the path ($C_0$, $C_1$, $C_7$, $C_{10}$, $C_5$) corresponding to "I want a hamburger." In that example, the optimal path may be mapped to a food-ordering user intent, and the "dish" slot associated with that intent, illustrated as slot $S_0$, may be mapped to "hamburger."

Figure 10:
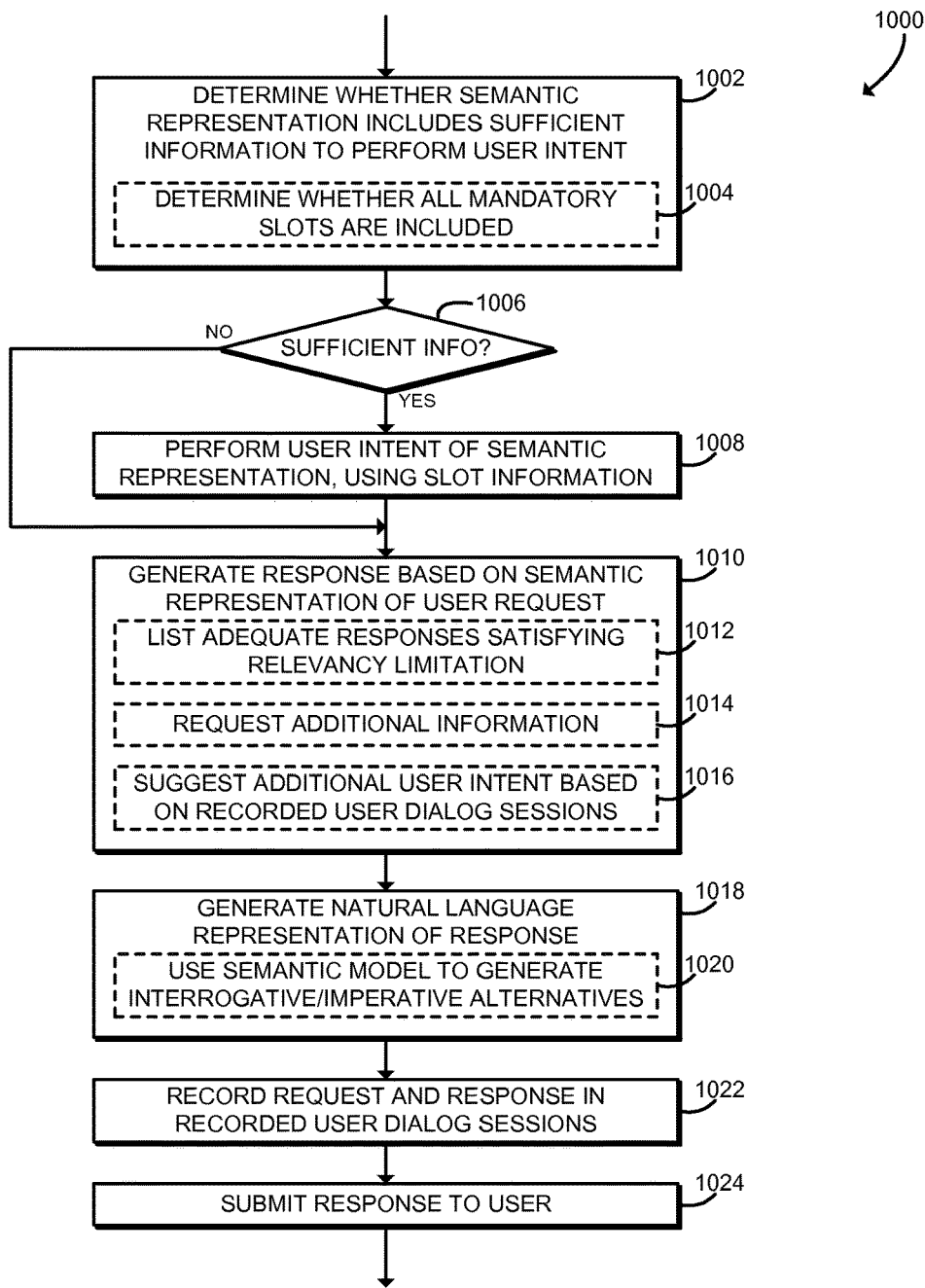
FIG. 10 is a simplified flow diagram of at least one embodiment of a method for user dialog session management that may be executed by the computing device of FIGS. 1 and 2.

Referring now to FIG. 10, in use, the computing device 102 may execute a method 1000 for user dialog session management. The method 1000 may be executed, for example, as part of block 306 as described above in connection with FIG. 3. The method 1000 begins with block 1002, in which the computing device 102 determines whether the semantic representation 220 includes sufficient information to perform the associated user intent. In some embodiments, in block 1004, the computing device 102 may determine whether the semantic representation 220 includes sufficient information by determining whether all mandatory slots associated with the user intent are included in the semantic representation 220. The semantic model 216 may include statistical information on the occurrence of slots with each user intent. That statistical information may be used to classify slots, for example, as optional, preferred, or mandatory. In block 1006, the computing device 102 determines whether sufficient information exists. If not, the method 1000 skips ahead to block 1010. If sufficient information is included, the method 1000 advances to block 1008.

In block 1008, the computing device 102 performs the user intent associated with the semantic representation 220, using information on slots included in the semantic representation 220. The computing device 102 may use any technique to perform the user intent, including calling an internal or external application, module, plug-in, script interface, or other request completion module.

In block 1010, the computing device 102 generates a response to the user request based on the semantic representation 220 of the natural language request 214. The computing device 102 may generate any appropriate response. For example, the computing device 102 may generate a response that provides information requested by the user, informs the user of the results of performing the user intent, requests additional information, or suggests a follow-up user intent. In block 1012, in some embodiments, the computing device 102 may generate a list of adequate responses to the natural language request 214 that are limited by a relevancy limitation. For example, the computing device 102 may return a list of shopping results that are limited by geographical distance or by price. In block 1014, in some embodiments the computing device 102 may request additional information from the user. For example, if the semantic representation 220 does not include one or more mandatory slots, or if one or more slots have ambiguous decodings, the computing device 102 may generate a request for additional information concerning those slots. In block 1016, in some embodiments the computing device 102 may suggest one or more additional user intents based on the recorded user dialog sessions 222. For example, based on historical data, the computing device 102 may determine that a particular user intent typically follows the current user intent. For example, the computing device 102 may determine that a "reminder action" user intent typically follows a "meeting" user intent, and thus may suggest the "reminder action" in response to the current semantic representation 220 being associated with the "meeting" user intent.

In block 1018, the computing device 102 generates a natural language representation of the response. The computing device 102 may use any technique to prepare the natural language representation, including generating a text representation and/or generating an audio representation using a text-to-speech converter. In some embodiments, in block 1020, the computing device 102 may use the semantic model 216 to generate interrogative and/or imperative alternatives to the language of the response. For example, the computing device 102 may use the semantic model 216 to generate interrogative forms of the language used to query the user for additional information on slots.

In block 1022, the computing device 102 records the natural language request 214 and the associated natural language response in the recorded user dialog sessions 222. The computing device 102 may store the request and response in any appropriate format. In some embodiments, the computing device 102 may also store additional information associated with the request and/or response, such as the candidate alternatives lattice 218 or the semantic representation 220. As described above, the recorded user dialog sessions 222 may be used to learn typical user dialog interactions, and to predict likely dialog interactions.

In block 1024, the computing device 102 submits the natural language representation of the response to the user. The computing device 102 may, for example, display the response on a display screen or output the response using a speaker or other audio device. In some embodiments, the computing device 102 may submit the response over the network 106 to a remote device, such as a client device 104. After submitting the response, the method 1000 is completed, and the computing device 102 may continue processing the natural language request 214 and/or process additional natural language requests 214.

Figure 11:
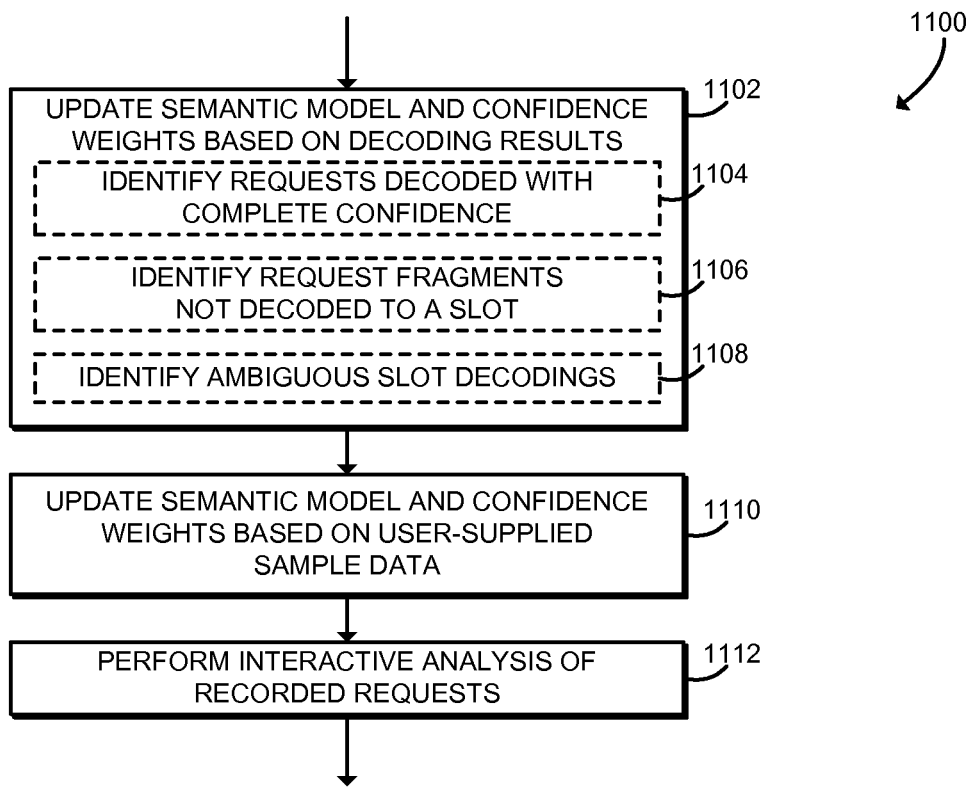
FIG. 11 is a simplified flow diagram of at least one embodiment of a method for analyzing and tuning natural language processing that may be executed by the computing device of FIGS. 1 and 2.

Referring now to FIG. 11, in use, the computing device 102 may execute a method 1100 for analyzing and tuning the VPA components described above. The method 1100 may be executed, for example, as part of block 308 as described above in connection with FIG. 3. The method 1100 begins with block 1102, in which the computing device 102 updates the semantic model 216 and associated confidence weights based on the results of decoding a natural language request 214. For example, the computing device 102 may optimize machine-learned (or otherwise determined) thresholds of the semantic compiler module 202, optimize adaptable thresholds of the request decoder module 204 (including both automatic speech recognition parameters based on user-data and user-history, and recorded queries and dynamic domains, as well as candidate alternatives lattice 218 generation thresholds including scores, weights and interpolation thereof), and optimize dialogue management module 208 trajectories. In block 1104, in some embodiments, the computing device 102 may identify requests that were decoded with complete confidence; that is, requests in which the intent and slots were fully resolved with no ambiguities. Those requests may be classified as perfect extractions. Queries decoded with complete confidence may be used for robust learning, as well as retrieval of equivalently-structured queries from across the web. In some embodiments, in block 1106, the computing device 102 may identify request fragments that were not decoded to a slot. The computing device 102 may analyze those fragments as either generic functional wording (repeated across domains), or meaningful fragments that should be used for a new form of slot extraction. In block 1108, in some embodiments the computing device 102 may identify ambiguous slot decodings. The computing device 102 may apply more fine-tuned subsequent resolution strategies to those ambiguous slot decodings.

In block 1110, the computing device 102 may update the semantic model 216 and/or confidence weights based on user-supplied sample data. For example, a system administrator may submit sample queries, tagged data, and matching logical patterns. In block 1112, the computing device 102 may perform interactive analysis of recorded requests. A system administrator may analyze the intent and slot resolution logic for each request, filter all queries extracted according to a specific strategy and/or logical patterns, as well as view improvements and regressions (given tagged data) following changes in data or explicit logic and/or pattern changes. After performing that analysis, the method 1100 is completed. As described above, the computing device 102 may continue to process natural language requests 214 using the updated semantic model 216.

Referring back to FIG. 3 as an illustrative example, the method 300 may be used in a system 100 for food ordering. During execution of block 302, in an offline stage, an ontology of restaurants may be constructed. The ontology may include of the following objects and relations: restaurant name, dishes on restaurant's menu, price of dish, description of dish, and location of restaurant. The ontology may be indexed to generate the semantic model 216. In the example, the sample request corpus 212 may include a large database of general user requests and/or queries, some of which contain food-ordering requests. Using unsupervised machine learning algorithms, requests may be clustered according to slots matched by the ontology index. Additionally or alternatively, user queries for food ordering may be solicited. Relevant CSFs may be extracted from food ordering queries. Relevant weights may be assigned to slots and functional elements of relevant CSFs. For example, a CSF such as (order-verb, quantity, dish-entity) may receive a score reflecting the matching of the dish-entity to a dish in the ontology index, or its respective description. Having compiled a semantic model 216, a validation-set of tagged queries may be employed to optimize scoring schemes using the CSFs and the ontology index. Once the semantic model 216 is consolidated, the computing device 102 may execute the block 304 online, employing an ASR engine optimized for the food ordering domain, using a language model (LM) constructed from in-domain user queries. Lattices may be generated using in-domain slots, and general LM fluency scores and phonetic similarity scores may be matched against the indexed ontology. For example, given a sentence such as "I won a humble girl," various candidates including "I want a hamburger" may be generated. The computing device 102 may select the maximally matching route identifying the mandatory slot "hamburger" as the requested order. Since the decoded natural language request 214 lacks the additional mandatory slot of the restaurant to be ordered from, during execution of block 306, the computing device 102 may engage in a user dialog session to request further information or alternatively presenting all hamburgers that can be ordered within a predefined radius. The method 300 may continue to decode subsequent natural language requests 214 until an order is placed. The block 308 may be executed periodically, continuously, or responsively along the way to evaluate and improve the VPA components described above either entirely automatically or semi-automatically.

As another illustrative example, the method 300 may be used in a system 100 for a virtual personalized shopping assistant. In this example, an ontology may be created in block 302 by automatically scanning catalogues and cross-matching products from various sources to allow for catalogue-and-web-based paraphrasing. Such a shopping assistant may employ all modules of the system 100 and capitalizes on the various modules' products including domain specific language models, ontology indexing, and appropriately tuned CSFs to automatically produce a shopping tool that is optimized for a user, vendor, and/or product domain.

EXAMPLES

Illustrative examples of the devices, systems, and methods disclosed herein are provided below. An embodiment of the devices, systems, and methods may include any one or more, and any combination of, the examples described below.

Example 1 includes a computing device for interpreting natural language requests, the computing device comprising a semantic compiler module to generate a semantic model as a function of a corpus of predefined requests, wherein the semantic model includes a plurality of mappings between a natural language request and a semantic representation of the natural language request, wherein the semantic representation identifies a user intent and zero or more slots associated with the user intent; and a request decoder module to generate, using the semantic model, a lattice of candidate alternatives indicative of a natural language request, wherein each candidate alternative corresponds to a token of the natural language request; assign a composite confidence weight to each candidate alternative as a function of the semantic model; determine an optimal route through the candidate alternative lattice based on the associated confidence weight; and generate a semantic representation of the natural language request as a function of the candidate alternatives of the optimal route.

Example 2 includes the subject matter of Example 1, and wherein to generate the semantic model comprises to identify a contextual semantic feature in the corpus, wherein the contextual semantic feature comprises a sequence of lexical sets associated with a user intent and zero or more slots associated with the user intent; determine a first probability of the contextual semantic feature given the user intent; and determine a normalized probability of the user intent as a function of a rate of occurrence of the contextual semantic feature in the corpus.

Example 3 includes the subject matter of any of Examples 1 and 2, and wherein to identify the contextual semantic feature comprises to identify the contextual semantic feature using a semi-supervised algorithm.

Example 4 includes the subject matter of any of Examples 1-3, and wherein to identify the contextual semantic feature using the semi-supervised algorithm comprises to tag a first group of predefined sample queries in the corpus to identify user intents and slots; extract the contextual semantic feature from the sample queries; analyze, using the semantic model, a second group of predefined sample queries in the corpus; extract additional contextual semantic features in response to analyzing the second group of predefined sample queries; and update the first probability and the normalized probability in response to analyzing the second group of predefined sample queries.

Example 5 includes the subject matter of any of Examples 1-4, and wherein the second group of predefined sample queries comprises recorded user data or a web corpus.

Example 6 includes the subject matter of any of Examples 1-5, and wherein to identify the contextual semantic feature comprises to identify the contextual semantic feature using an unsupervised algorithm.

Example 7 includes the subject matter of any of Examples 1-6, and wherein to identify the contextual semantic feature using the unsupervised algorithm comprises to identify predefined named entities and relationships in a first group of predefined sample queries in the corpus; cluster the predefined sample queries using an unsupervised clustering algorithm to generate a plurality of clusters; and assign a user intent and slots to each cluster of the plurality of clusters.

Example 8 includes the subject matter of any of Examples 1-7, and wherein to generate the semantic model comprises to generate an ontological index as a function of a predefined ontology associated with the user intent, wherein the ontology includes a plurality of objects describing a knowledge domain.

Example 9 includes the subject matter of any of Examples 1-8, and wherein to generate the ontological index comprises to assign a vector space to an object type of the predefined ontology, wherein the vector space includes a plurality of coordinates, wherein each coordinate encodes a lexical token representing an associated object of the ontology; and map a slot of the user intent associated with the predefined ontology to the vector space.

Example 10 includes the subject matter of any of Examples 1-9, and wherein the request decoder module is further to receive a representation of speech data indicative of the natural language request; and convert the representation of speech data to a first lattice of candidate alternatives indicative of the natural language request; wherein to generate the lattice of candidate alternatives comprises to generate the lattice of candidate alternatives in response to conversion of the representation of speech data to the first lattice of candidate alternatives.

Example 11 includes the subject matter of any of Examples 1-10, and wherein to convert the representation of speech data comprises to convert the representation of speech data using a language model generated as a function of a domain-biased web corpus.

Example 12 includes the subject matter of any of Examples 1-11, and wherein to generate the lattice comprises to generate a candidate alternative corresponding to a user intent and associated slots of a mapping of the semantic model.

Example 13 includes the subject matter of any of Examples 1-12, and wherein to generate the candidate alternative comprises to generate a candidate alternative matching a contextual semantic feature of the semantic model.

Example 14 includes the subject matter of any of Examples 1-13, and wherein to generate the candidate alternative comprises to generate a candidate alternative matching an ontological index of the semantic model.

Example 15 includes the subject matter of any of Examples 1-14, and wherein to generate the lattice comprises to generate a candidate alternative using a language model, as a function of phonetic similarity to the natural language request.

Example 16 includes the subject matter of any of Examples 1-15, and wherein to generate the lattice comprises to generate a candidate alternative using a semantic enrichment, a contextual feature sequence, an entity-based feature, a relation-based feature, or a non-semantic filler.

Example 17 includes the subject matter of any of Examples 1-16, and wherein to assign the composite confidence weight further comprises to assign a confidence weight as a function of a language model.

Example 18 includes the subject matter of any of Examples 1-17, and wherein to assign the confidence weight as a function of the language model comprises to assign a phonetic similarity score, a general language model confidence score, a domain language model score, or a syntactic confidence score.

Example 19 includes the subject matter of any of Examples 1-18, and wherein to assign the confidence weight as a function of the semantic model comprises to assign an intent-and-slot confidence score.

Example 20 includes the subject matter of any of Examples 1-19, and wherein the request decoder module is further to determine whether a total confidence weight of the optimal route has a predefined relationship to a predefined threshold confidence; and generate additional candidate alternatives in the lattice of candidate alternatives in response to a determination that the total confidence weight has the predefined relationship to the predefined threshold confidence.

Example 21 includes the subject matter of any of Examples 1-20, and further including a dialog management module to process the semantic representation of the natural language request to perform a user dialog interaction.

Example 22 includes the subject matter of any of Examples 1-21, and further including a dialog management module to determine whether the semantic representation of the natural language request includes sufficient information to perform a user intent of the semantic representation; perform the user intent in response to a determination that the semantic representation includes sufficient information; generate a response as a function of the semantic representation; generate a natural language representation of the response using the semantic model; and record a user dialog session including the natural language request and the natural language representation of the response into a corpus of recorded user dialog sessions.

Example 23 includes the subject matter of any of Examples 1-22, and wherein to determine whether the semantic representation includes sufficient information comprises to determine, using the semantic model, whether the semantic representation includes a mandatory slot associated with the user intent of the semantic representation; and to generate the response comprises to generate a request for additional information relevant to the mandatory slot in response to a determination that the semantic representation does not include the mandatory slot.

Example 24 includes the subject matter of any of Examples 1-23, and wherein to generate the response comprises to generate a plurality of possible responses as a function of the semantic representation; and limit the response to adequate responses of the plurality of responses, wherein the adequate responses satisfy a relevancy limitation.

Example 25 includes the subject matter of any of Examples 1-24, and wherein to generating the response comprises to determine an additional user intent as a function of the user intent of the semantic representation and the corpus of recorded user dialog sessions; and generate a response including the additional user intent.

Example 26 includes the subject matter of any of Examples 1-25, and further including a tuning module to update the semantic model in response to generating the semantic representation.

Example 27 includes the subject matter of any of Examples 1-26, and wherein to update the semantic model comprises to determine the semantic representation was generated with no ambiguities.

Example 28 includes the subject matter of any of Examples 1-27, and wherein to update the semantic model comprises to identify a token of the natural language request that was not decoded.

Example 29 includes the subject matter of any of Examples 1-28, and wherein to updating the semantic model comprises to identify an ambiguous decoding of a slot of the semantic representation.

Example 30 includes a method for interpreting natural language requests, the method comprising generating, by a computing device, a semantic model as a function of a corpus of predefined requests, wherein the semantic model includes a plurality of mappings between a natural language request and a semantic representation of the natural language request, wherein the semantic representation identifies a user intent and zero or more slots associated with the user intent; generating, by the computing device using the semantic model, a lattice of candidate alternatives indicative of a natural language request, wherein each candidate alternative corresponds to a token of the natural language request; assigning, by the computing device, a composite confidence weight to each candidate alternative as a function of the semantic model; determining, by the computing device, an optimal route through the candidate alternative lattice based on the associated confidence weight; and generating, by the computing device, a semantic representation of the natural language request as a function of the candidate alternatives of the optimal route.

Example 31 includes the subject matter of Example 30, and wherein generating the semantic model comprises identifying a contextual semantic feature in the corpus, wherein the contextual semantic feature comprises a sequence of lexical sets associated with a user intent and zero or more slots associated with the user intent; determining a first probability of the contextual semantic feature given the user intent; and determining a normalized probability of the user intent as a function of a rate of occurrence of the contextual semantic feature in the corpus.

Example 32 includes the subject matter of any of Examples 30 and 31, and wherein identifying the contextual semantic feature comprises identifying the contextual semantic feature using a semi-supervised algorithm.

Example 33 includes the subject matter of any of Examples 30-32, and wherein identifying the contextual semantic feature using the semi-supervised algorithm comprises tagging a first group of predefined sample queries in the corpus to identify user intents and slots; extracting the contextual semantic feature from the sample queries; analyzing, using the semantic model, a second group of predefined sample queries in the corpus; extracting additional contextual semantic features in response to analyzing the second group of predefined sample queries; and updating the first probability and the normalized probability in response to analyzing the second group of predefined sample queries.

Example 34 includes the subject matter of any of Examples 30-33, and wherein the second group of predefined sample queries comprises recorded user data or a web corpus.

Example 35 includes the subject matter of any of Examples 30-34, and wherein identifying the contextual semantic feature comprises identifying the contextual semantic feature using an unsupervised algorithm.

Example 36 includes the subject matter of any of Examples 30-35, and wherein identifying the contextual semantic feature using the unsupervised algorithm comprises identifying predefined named entities and relationships in a first group of predefined sample queries in the corpus; clustering the predefined sample queries using an unsupervised clustering algorithm to generate a plurality of clusters; and assigning a user intent and slots to each cluster of the plurality of clusters.

Example 37 includes the subject matter of any of Examples 30-36, and wherein generating the semantic model comprises generating an ontological index as a function of a predefined ontology associated with the user intent, wherein the ontology includes a plurality of objects describing a knowledge domain.

Example 38 includes the subject matter of any of Examples 30-37, and wherein generating the ontological index comprises assigning a vector space to an object type of the predefined ontology, wherein the vector space includes a plurality of coordinates, wherein each coordinate encodes a lexical token representing an associated object of the ontology; and mapping a slot of the user intent associated with the predefined ontology to the vector space.

Example 39 includes the subject matter of any of Examples 30-38, and further including receiving, by the computing device, a representation of speech data indicative of the natural language request; and converting, by the computing device, the representation of speech data to a first lattice of candidate alternatives indicative of the natural language request; wherein generating the lattice of candidate alternatives comprises generating the lattice of candidate alternatives in response to converting the representation of speech data to the first lattice of candidate alternatives.

Example 40 includes the subject matter of any of Examples 30-39, and wherein converting the representation of speech data comprises converting the representation of speech data using a language model generated as a function of a domain-biased web corpus.

Example 41 includes the subject matter of any of Examples 30-40, and wherein generating the lattice comprises generating a candidate alternative corresponding to a user intent and associated slots of a mapping of the semantic model.

Example 42 includes the subject matter of any of Examples 30-41, and wherein generating the candidate alternative comprises generating a candidate alternative matching a contextual semantic feature of the semantic model.

Example 43 includes the subject matter of any of Examples 30-42, and wherein generating the candidate alternative comprises generating a candidate alternative matching an ontological index of the semantic model.

Example 44 includes the subject matter of any of Examples 30-43, and wherein generating the lattice comprises generating a candidate alternative using a language model, as a function of phonetic similarity to the natural language request.

Example 45 includes the subject matter of any of Examples 30-44, and wherein generating the lattice comprises generating a candidate alternative using a semantic enrichment, a contextual feature sequence, an entity-based feature, a relation-based feature, or a non-semantic filler.

Example 46 includes the subject matter of any of Examples 30-45, and wherein assigning the composite confidence weight further comprises assigning a confidence weight as a function of a language model.

Example 47 includes the subject matter of any of Examples 30-46, and wherein assigning the confidence weight as a function of the language model comprises assigning a phonetic similarity score, a general language model confidence score, a domain language model score, or a syntactic confidence score.

Example 48 includes the subject matter of any of Examples 30-47, and wherein assigning the confidence weight as a function of the semantic model comprises assigning an intent-and-slot confidence score.

Example 49 includes the subject matter of any of Examples 30-48, and further including determining, by the computing device, whether a total confidence weight of the optimal route has a predefined relationship to a predefined threshold confidence; and generating, by the computing device, additional candidate alternatives in the lattice of candidate alternatives in response to determining the total confidence weight has the predefined relationship to the predefined threshold confidence.

Example 50 includes the subject matter of any of Examples 30-49, and further including processing, by the computing device, the semantic representation of the natural language request to perform a user dialog interaction.

Example 51 includes the subject matter of any of Examples 30-50, and further including determining, by the computing device, whether the semantic representation of the natural language request includes sufficient information to perform a user intent of the semantic representation; performing, by the computing device, the user intent in response to determining that the semantic representation includes sufficient information; generating, by the computing device, a response as a function of the semantic representation; generating, by the computing device, a natural language representation of the response using the semantic model; and recording, by the computing device, a user dialog session including the natural language request and the natural language representation of the response into a corpus of recorded user dialog sessions.

Example 52 includes the subject matter of any of Examples 30-51, and wherein determining whether the semantic representation includes sufficient information comprises determining, using the semantic model, whether the semantic representation includes a mandatory slot associated with the user intent of the semantic representation; and generating the response comprises generating a request for additional information relevant to the mandatory slot in response to determining that the semantic representation does not include the mandatory slot.

Example 53 includes the subject matter of any of Examples 30-52, and wherein generating the response comprises generating a plurality of possible responses as a function of the semantic representation; and limiting the response to adequate responses of the plurality of responses, wherein the adequate responses satisfy a relevancy limitation.

Example 54 includes the subject matter of any of Examples 30-53, and wherein generating the response comprises determining an additional user intent as a function of the user intent of the semantic representation and the corpus of recorded user dialog sessions; and generating a response including the additional user intent.

Example 55 includes the subject matter of any of Examples 30-54, and further including updating, by the computing device, the semantic model in response to generating the semantic representation.

Example 56 includes the subject matter of any of Examples 30-55, and wherein updating the semantic model comprises determining the semantic representation was generated with no ambiguities.

Example 57 includes the subject matter of any of Examples 30-56, and wherein updating the semantic model comprises identifying a token of the natural language request that was not decoded.

Example 58 includes the subject matter of any of Examples 30-57, and wherein updating the semantic model comprises identifying an ambiguous decoding of a slot of the semantic representation.

Example 59 includes a computing device comprising a processor; and a memory having stored therein a plurality of instructions that when executed by the processor cause the computing device to perform the method of any of Examples 30-58.

Example 60 includes one or more machine readable storage media comprising a plurality of instructions stored thereon that in response to being executed result in a computing device performing the method of any of Examples 30-58.

Example 61 includes a computing device comprising means for performing the method of any of Examples 30-58.

Example 62 includes a computing device for interpreting natural language requests, the computing device comprising means for generating a semantic model as a function of a corpus of predefined requests, wherein the semantic model includes a plurality of mappings between a natural language request and a semantic representation of the natural language request, wherein the semantic representation identifies a user intent and zero or more slots associated with the user intent; means for generating, using the semantic model, a lattice of candidate alternatives indicative of a natural language request, wherein each candidate alternative corresponds to a token of the natural language request; means for assigning a composite confidence weight to each candidate alternative as a function of the semantic model; means for determining an optimal route through the candidate alternative lattice based on the associated confidence weight; and means for generating a semantic representation of the natural language request as a function of the candidate alternatives of the optimal route.

Example 63 includes the subject matter of Example 62, and wherein the means for generating the semantic model comprises means for identifying a contextual semantic feature in the corpus, wherein the contextual semantic feature comprises a sequence of lexical sets associated with a user intent and zero or more slots associated with the user intent; means for determining a first probability of the contextual semantic feature given the user intent; and means for determining a normalized probability of the user intent as a function of a rate of occurrence of the contextual semantic feature in the corpus.

Example 64 includes the subject matter of any of Examples 62 and 63, and wherein the means for identifying the contextual semantic feature comprises means for identifying the contextual semantic feature using a semi-supervised algorithm.

Example 65 includes the subject matter of any of Examples 62-64, and wherein the means for identifying the contextual semantic feature using the semi-supervised algorithm comprises means for tagging a first group of predefined sample queries in the corpus to identify user intents and slots; means for extracting the contextual semantic feature from the sample queries; means for analyzing, using the semantic model, a second group of predefined sample queries in the corpus; means for extracting additional contextual semantic features in response to analyzing the second group of predefined sample queries; and means for updating the first probability and the normalized probability in response to analyzing the second group of predefined sample queries.

Example 66 includes the subject matter of any of Examples 62-65, and wherein the second group of predefined sample queries comprises recorded user data or a web corpus.

Example 67 includes the subject matter of any of Examples 62-66, and wherein the means for identifying the contextual semantic feature comprises means for identifying the contextual semantic feature using an unsupervised algorithm.

Example 68 includes the subject matter of any of Examples 62-67, and wherein the means for identifying the contextual semantic feature using the unsupervised algorithm comprises means for identifying predefined named entities and relationships in a first group of predefined sample queries in the corpus; means for clustering the predefined sample queries using an unsupervised clustering algorithm to generate a plurality of clusters; and means for assigning a user intent and slots to each cluster of the plurality of clusters.

Example 69 includes the subject matter of any of Examples 62-68, and wherein the means for generating the semantic model comprises means for generating an ontological index as a function of a predefined ontology associated with the user intent, wherein the ontology includes a plurality of objects describing a knowledge domain.

Example 70 includes the subject matter of any of Examples 62-69, and wherein the means for generating the ontological index comprises means for assigning a vector space to an object type of the predefined ontology, wherein the vector space includes a plurality of coordinates, wherein each coordinate encodes a lexical token representing an associated object of the ontology; and means for mapping a slot of the user intent associated with the predefined ontology to the vector space.

Example 71 includes the subject matter of any of Examples 62-70, and further including means for receiving a representation of speech data indicative of the natural language request; and means for converting the representation of speech data to a first lattice of candidate alternatives indicative of the natural language request; wherein the means for generating the lattice of candidate alternatives comprises means for generating the lattice of candidate alternatives in response to converting the representation of speech data to the first lattice of candidate alternatives.

Example 72 includes the subject matter of any of Examples 62-71, and wherein the means for converting the representation of speech data comprises means for converting the representation of speech data using a language model generated as a function of a domain-biased web corpus.

Example 73 includes the subject matter of any of Examples 62-72, and wherein the means for generating the lattice comprises means for generating a candidate alternative corresponding to a user intent and associated slots of a mapping of the semantic model.

Example 74 includes the subject matter of any of Examples 62-73, and wherein the means for generating the candidate alternative comprises means for generating a candidate alternative matching a contextual semantic feature of the semantic model.

Example 75 includes the subject matter of any of Examples 62-74, and, wherein the means for generating the candidate alternative comprises means for generating a candidate alternative matching an ontological index of the semantic model.

Example 76 includes the subject matter of any of Examples 62-75, and wherein the means for generating the lattice comprises means for generating a candidate alternative using a language model, as a function of phonetic similarity to the natural language request.

Example 77 includes the subject matter of any of Examples 62-76, and, wherein the means for generating the lattice comprises means for generating a candidate alternative using a semantic enrichment, a contextual feature sequence, an entity-based feature, a relation-based feature, or a non-semantic filler.

Example 78 includes the subject matter of any of Examples 62-77, and wherein the means for assigning the composite confidence weight further comprises means for assigning a confidence weight as a function of a language model.

Example 79 includes the subject matter of any of Examples 62-78, and wherein the means for assigning the confidence weight as a function of the language model comprises means for assigning a phonetic similarity score, a general language model confidence score, a domain language model score, or a syntactic confidence score.

Example 80 includes the subject matter of any of Examples 62-79, and wherein the means for assigning the confidence weight as a function of the semantic model comprises means for assigning an intent-and-slot confidence score.

Example 81 includes the subject matter of any of Examples 62-80, and further including means for determining whether a total confidence weight of the optimal route has a predefined relationship to a predefined threshold confidence; and means for generating additional candidate alternatives in the lattice of candidate alternatives in response to determining the total confidence weight has the predefined relationship to the predefined threshold confidence.

Example 82 includes the subject matter of any of Examples 62-81, and further including means for processing the semantic representation of the natural language request to perform a user dialog interaction.

Example 83 includes the subject matter of any of Examples 62-82, and further including means for determining whether the semantic representation of the natural language request includes sufficient information to perform a user intent of the semantic representation; means for performing the user intent in response to determining that the semantic representation includes sufficient information; means for generating a response as a function of the semantic representation; means for generating a natural language representation of the response using the semantic model; and means for recording a user dialog session including the natural language request and the natural language representation of the response into a corpus of recorded user dialog sessions.

Example 84 includes the subject matter of any of Examples 62-83, and wherein the means for determining whether the semantic representation includes sufficient information comprises means for determining, using the semantic model, whether the semantic representation includes a mandatory slot associated with the user intent of the semantic representation; and the means for generating the response comprises means for generating a request for additional information relevant to the mandatory slot in response to determining that the semantic representation does not include the mandatory slot.

Example 85 includes the subject matter of any of Examples 62-84, and wherein the means for generating the response comprises means for generating a plurality of possible responses as a function of the semantic representation; and means for limiting the response to adequate responses of the plurality of responses, wherein the adequate responses satisfy a relevancy limitation.

Example 86 includes the subject matter of any of Examples 62-85, and wherein the means for generating the response comprises means for determining an additional user intent as a function of the user intent of the semantic representation and the corpus of recorded user dialog sessions; and means for generating a response including the additional user intent.

Example 87 includes the subject matter of any of Examples 62-86, and further including means for updating the semantic model in response to generating the semantic representation.

Example 88 includes the subject matter of any of Examples 62-87, and wherein the means for updating the semantic model comprises means for determining the semantic representation was generated with no ambiguities.

Example 89 includes the subject matter of any of Examples 62-88, and wherein the means for updating the semantic model comprises means for identifying a token of the natural language request that was not decoded.

Example 90 includes the subject matter of any of Examples 62-89, and wherein the means for updating the semantic model comprises means for identifying an ambiguous decoding of a slot of the semantic representation.

The invention claimed is:

1. A computing device for interpreting natural language requests, the computing device comprising:
   a semantic compiler module to generate a semantic model as a function of a corpus of predefined requests, wherein the semantic model includes a plurality of mappings between a natural language request and a semantic representation of the natural language request, wherein the semantic representation identifies a user intent and zero or more slots associated with the user intent; and
   a request decoder module to: (i) receive a representation of speech data indicative of a natural language request; (ii) convert the representation of speech data to a first lattice of candidate alternatives indicative of the natural language request, wherein to convert the representation of speech data comprises to convert the representation of speech data using a language model generated as a function of a domain-biased web corpus; (iii) generate, using the semantic model, a lattice of candidate alternatives indicative of the natural language request in response to conversion of the representation of speech data to the first lattice of candidate alternatives, wherein each candidate alternative corresponds to a token of the natural language request; (iv) assign a composite confidence weight to each candidate alternative as a function of the semantic model; (v) determine an optimal route through the candidate alternative lattice based on an associated confidence weight; and (vi) generate a semantic representation of the natural language request as a function of the candidate alternatives of the optimal route.

2. The computing device of claim 1, wherein to generate the semantic model comprises to:
   identify a contextual semantic feature in the corpus, wherein the contextual semantic feature comprises a sequence of lexical sets associated with a user intent and zero or more slots associated with the user intent;
   determine a first probability of the contextual semantic feature given the user intent; and
   determine a normalized probability of the user intent as a function of a rate of occurrence of the contextual semantic feature in the corpus.

3. The computing device of claim 2, wherein to identify the contextual semantic feature comprises to identify the contextual semantic feature using a semi-supervised algorithm, wherein to identify the contextual semantic feature using the semi-supervised algorithm comprises to:
   tag a first group of predefined sample queries in the corpus to identify user intents and slots;
   extract the contextual semantic feature from the predefined sample queries;
   analyze, using the semantic model, a second group of predefined sample queries in the corpus;
   extract additional contextual semantic features in response to analyzing the second group of predefined sample queries; and
   update the first probability and the normalized probability in response to analyzing the second group of predefined sample queries.

4. The computing device of claim 2, wherein to identify the contextual semantic feature comprises to identify the contextual semantic feature using an unsupervised algorithm, wherein to identify the contextual semantic feature using the unsupervised algorithm comprises to:
  identify predefined named entities and relationships in a first group of predefined sample queries in the corpus;
  cluster the predefined sample queries using an unsupervised clustering algorithm to generate a plurality of clusters; and
  assign a user intent and slots to each cluster of the plurality of clusters.

5. The computing device of claim 1, wherein to generate the semantic model comprises to:
  generate an ontological index as a function of a predefined ontology associated with the user intent, wherein the predefined ontology includes a plurality of objects describing a knowledge domain.

6. The computing device of claim 5, wherein to generate the ontological index comprises to:
  assign a vector space to an object type of the predefined ontology, wherein the vector space includes a plurality of coordinates, wherein each coordinate encodes a lexical token representing an associated object of the predefined ontology; and
  map a slot of the user intent associated with the predefined ontology to the vector space.

7. The computing device of claim 1, wherein to generate the lattice of candidate alternatives comprises to:
  generate a candidate alternative corresponding to a user intent and associated slots of a mapping of the semantic model; and
  generate a candidate alternative using a language model, as a function of phonetic similarity to the natural language request.

8. The computing device of claim 1, wherein to assign the composite confidence weight further comprises to assign a confidence weight as a function of a language model.

9. The computing device of claim 8, wherein to assign the confidence weight as a function of the language model comprises to assign a phonetic similarity score, a general language model confidence score, a domain language model score, or a syntactic confidence score.

10. The computing device of claim 1, further comprising a dialog management module to:
  determine whether the semantic representation of the natural language request includes sufficient information to perform a user intent of the semantic representation;
  perform the user intent in response to a determination that the semantic representation includes sufficient information;
  generate a response as a function of the semantic representation;
  generate a natural language representation of the response using the semantic model; and
  record a user dialog session including the natural language request and the natural language representation of the response into a corpus of recorded user dialog sessions.

11. The computing device of claim 1, further comprising a tuning module to update the semantic model in response to generating the semantic representation.

12. The computing device of claim 11, wherein to update the semantic model comprises to:
  determine the semantic representation was generated with no ambiguities;
  identify a token of the natural language request that was not decoded; or
  identify an ambiguous decoding of a slot of the semantic representation.

13. A method for interpreting natural language requests, the method comprising:
  generating, by a computing device, a semantic model as a function of a corpus of predefined requests, wherein the semantic model includes a plurality of mappings between a natural language request and a semantic representation of the natural language request, wherein the semantic representation identifies a user intent and zero or more slots associated with the user intent;
  receiving, by the computing device, a representation of speech data indicative of a natural language request;
  converting, by the computing device, the representation of speech data to a first lattice of candidate alternatives indicative of the natural language request, wherein converting the representation of speech data comprises converting the representation of speech data using a language model generated as a function of a domain-biased web corpus;
  generating, by the computing device using the semantic model, a lattice of candidate alternatives indicative of the natural language request in response to converting the representation of speech data to the first lattice of candidate alternatives, wherein each candidate alternative corresponds to a token of the natural language request;
  assigning, by the computing device, a composite confidence weight to each candidate alternative as a function of the semantic model;
  determining, by the computing device, an optimal route through the candidate alternative lattice based on an associated confidence weight; and
  generating, by the computing device, a semantic representation of the natural language request as a function of the candidate alternatives of the optimal route.

14. The method of claim 13, wherein generating the semantic model comprises:
  identifying a contextual semantic feature in the corpus, wherein the contextual semantic feature comprises a sequence of lexical sets associated with a user intent and zero or more slots associated with the user intent;
  determining a first probability of the contextual semantic feature given the user intent; and
  determining a normalized probability of the user intent as a function of a rate of occurrence of the contextual semantic feature in the corpus.

15. The method of claim 13, wherein generating the semantic model comprises:
  generating an ontological index as a function of a predefined ontology associated with the user intent, wherein the predefined ontology includes a plurality of objects describing a knowledge domain.

16. The method of claim 13, wherein generating the lattice comprises:
  generating a candidate alternative corresponding to a user intent and associated slots of a mapping of the semantic model; and
  generating a candidate alternative using a language model, as a function of phonetic similarity to the natural language request.

17. The method of claim 13, further comprising:
  determining, by the computing device, whether the semantic representation of the natural language request includes sufficient information to perform a user intent of the semantic representation;
  performing, by the computing device, the user intent in response to determining that the semantic representation includes sufficient information;

generating, by the computing device, a response as a function of the semantic representation;

generating, by the computing device, a natural language representation of the response using the semantic model; and recording, by the computing device, a user dialog session including the natural language request and the natural language representation of the response into a corpus of recorded user dialog sessions.

18. The method of claim 13, further comprising:

updating, by the computing device, the semantic model in response to generating the semantic representation.

19. One or more computer-readable storage media comprising a plurality of instructions that in response to being executed cause a computing device to:

generate a semantic model as a function of a corpus of predefined requests, wherein the semantic model includes a plurality of mappings between a natural language request and a semantic representation of the natural language request, wherein the semantic representation identifies a user intent and zero or more slots associated with the user intent;

receive a representation of speech data indicative of a natural language request;

convert the representation of speech data to a first lattice of candidate alternatives indicative of the natural language request, wherein to convert the representation of speech data comprises to convert the representation of speech data using a language model generated as a function of a domain-biased web corpus;

generate, using the semantic model, a lattice of candidate alternatives indicative of the natural language request in response to converting the representation of speech data to the first lattice of candidate alternatives, wherein each candidate alternative corresponds to a token of the natural language request;

assign a composite confidence weight to each candidate alternative as a function of the semantic model;

determine an optimal route through the candidate alternative lattice based on an associated confidence weight; and generate a semantic representation of the natural language request as a function of the candidate alternatives of the optimal route.

20. The one or more computer-readable storage media of claim 19, wherein to generate the semantic model comprises to:

identify a contextual semantic feature in the corpus, wherein the contextual semantic feature comprises a sequence of lexical sets associated with a user intent and zero or more slots associated with the user intent;

determine a first probability of the contextual semantic feature given the user intent; and determine a normalized probability of the user intent as a function of a rate of occurrence of the contextual semantic feature in the corpus.

* * * * *